(12) United States Patent
Hora et al.

(10) Patent No.: US 12,431,787 B2
(45) Date of Patent: Sep. 30, 2025

(54) DIGITAL CONTROLLER

(71) Applicant: Renesas Design (UK) Limited, Bourne End (GB)

(72) Inventors: Codrin Hora, Edinburgh (GB); Guillaume De Cremoux, Edinburgh (GB); Thomas Mayerwieser, Edinburgh (GB)

(73) Assignee: Renesas Design (UK) Limited, Bourne End (GB)

( * ) Notice: Subject to any disclaimer, the term of this patent is extended or adjusted under 35 U.S.C. 154(b) by 149 days.

(21) Appl. No.: 18/361,372

(22) Filed: Jul. 28, 2023

(65) Prior Publication Data

US 2025/0038648 A1　Jan. 30, 2025

(51) Int. Cl.
  *H02M 3/157* (2006.01)
  *H02M 1/14* (2006.01)
  *H02M 3/158* (2006.01)

(52) U.S. Cl.
  CPC ............. *H02M 1/14* (2013.01); *H02M 3/157* (2013.01); *H02M 3/1584* (2013.01)

(58) Field of Classification Search
  CPC .......... H02M 1/14; H02M 1/143; H02M 1/15; H02M 3/157; H02M 3/158; H02M 3/1584
  See application file for complete search history.

(56) References Cited

U.S. PATENT DOCUMENTS 9,419,627 B2　8/2016　Guthrie et al.
9,667,260 B2　5/2017　Guthrie et al.
2006/0043954 A1　3/2006　Markowski
2006/0044709 A1　3/2006　Seiersen
2007/0103122 A1*　5/2007　Morong ............. G05F 1/46
　　　　　　　　　　　　　　　　　　　　　　　323/205

(Continued)

OTHER PUBLICATIONS

Qiu et al., "Digital Average Current-Mode Control of PWM DC-DC Converters Without Current Sensors", IEEE Transactions on Industrial Electronics, vol. 57, No. 5, May 2010, pp. 1670-1677.

(Continued)

*Primary Examiner* — Gary L Laxton
(74) *Attorney, Agent, or Firm* — SCULLY, SCOTT, MURPHY & PRESSER, P.C.

(57) ABSTRACT

A digital controller for a switching converter configured to receive an input voltage and to generate an output voltage, the switching converter comprising one or more power switches and an energy storage element, the digital controller comprising a ripple cancellation signal generator configured to generate a ripple cancellation signal, the digital controller being configured to receive a digitized current signal, the digitized current signal being a digital representation of a current flow through the energy storage element, generate a filtered digital current error signal using the digitized current signal and the ripple cancellation signal, the ripple cancellation signal being arranged to reduce ripple from the digitized current signal in the generation of the filtered digital current error signal, and control the switching converter, the control of the switching converter being dependent on the filtered digital current error signal, wherein the ripple cancellation signal, within each signal period, comprises a rising slope comprising a first non-linear portion, and/or a falling slope comprising a second non-linear portion.

21 Claims, 22 Drawing Sheets

(56) References Cited

U.S. PATENT DOCUMENTS

| | | | |
|---|---|---|---|
| 2009/0102446 A1 | 4/2009 | Takahashi et al. | |
| 2009/0174262 A1* | 7/2009 | Martin | H02M 3/157 307/82 |
| 2010/0188062 A1* | 7/2010 | Candage | H02M 3/1588 323/271 |
| 2011/0227549 A1 | 9/2011 | Huang et al. | |
| 2015/0003122 A1 | 1/2015 | Cui et al. | |
| 2015/0303790 A1 | 10/2015 | Lin et al. | |
| 2016/0352237 A1 | 12/2016 | Quigley | |
| 2016/0380534 A1 | 12/2016 | Harshey et al. | |
| 2018/0062530 A1 | 3/2018 | Kong et al. | |
| 2019/0379290 A1 | 12/2019 | Takada et al. | |
| 2022/0294343 A1* | 9/2022 | Peretz | H02M 3/1566 |
| 2023/0213954 A1 | 7/2023 | Guthrie et al. | |
| 2023/0216411 A1 | 7/2023 | Grisamore et al. | |
| 2023/0216791 A1 | 7/2023 | Grisamore et al. | |
| 2023/0327548 A1* | 10/2023 | Yun | H02M 1/0058 |
| 2025/0038648 A1 | 1/2025 | Hora et al. | |

OTHER PUBLICATIONS

Ferdowsi M, "An Estimative Current Mode Controller for DC-DC Converters Operating in Continuous Conduction Mode", Proceedings of the 21st Annual IEEE Applied Power Electronics Conference and Exposition, Mar. 1, 2006, pp. 1133-1136.

Channappanavar et al., "An Inductor Current Estimator for Digitally Controlled Synchronous Buck Converter", IEEE Transactions on Power Electronics, vol. 34, No. 5, May 2019, pp. 4883-4894.

Kugelstadt T., "Auto-zero amplifiers ease the design of high-precision circuits", Analog Applications Journal, Second Quarter, 2005, pp. 19-27.

U.S. Non-Final Office Action dated May 7, 2025 issued in U.S. Appl. No. 18/361,274.

U.S. Non-Final Office Action dated Apr. 28, 2025 issued in U.S. Appl. No. 18/361,345.

U.S. Non-Final Office Action dated August 13, 2025 issued in U.S. Appl. No. 18/361,240.

\* cited by examiner

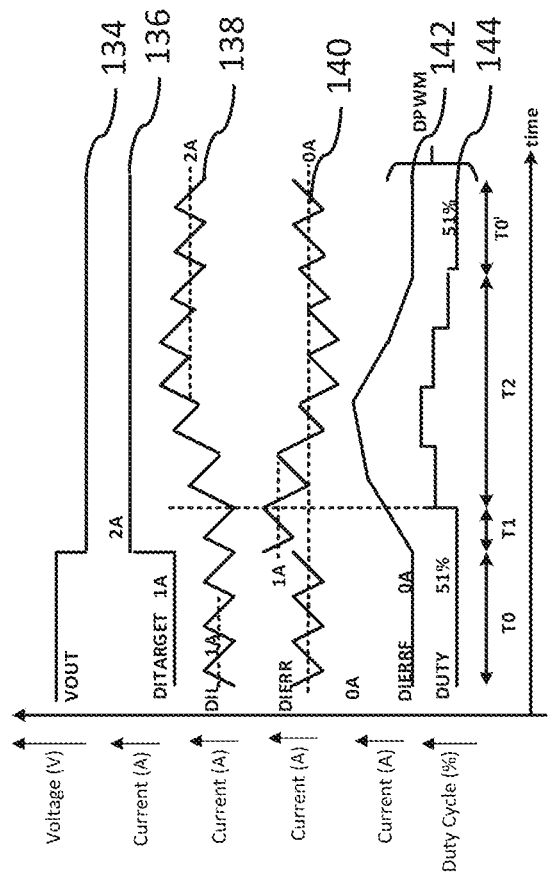
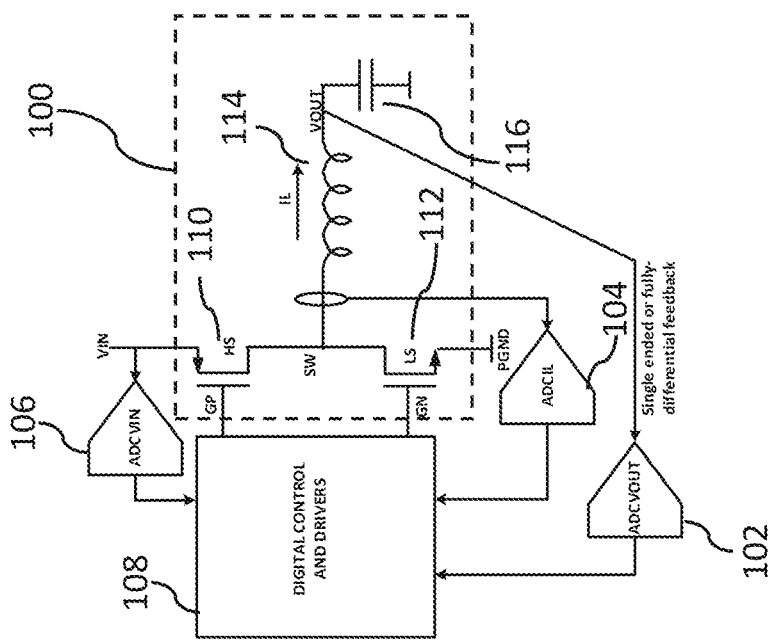
*Figure 1(c)*
*Figure 1(a)*

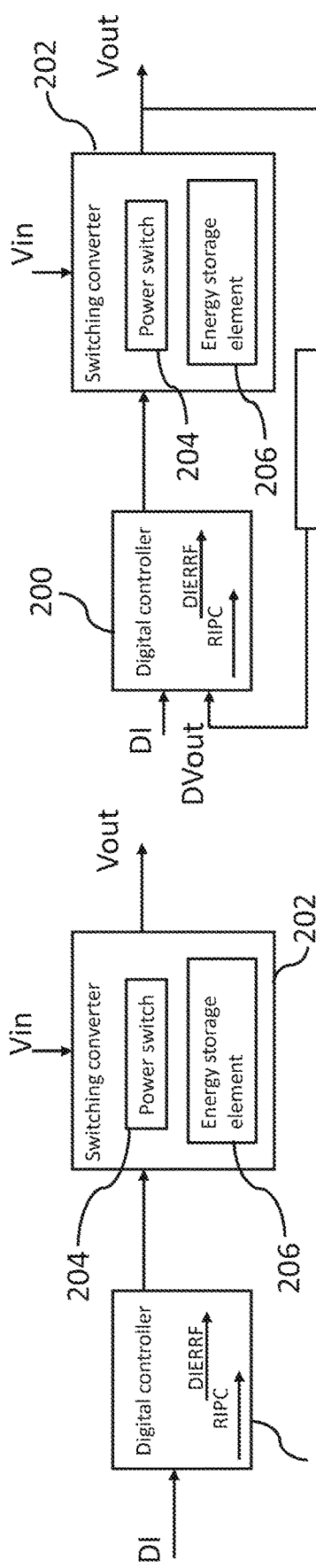
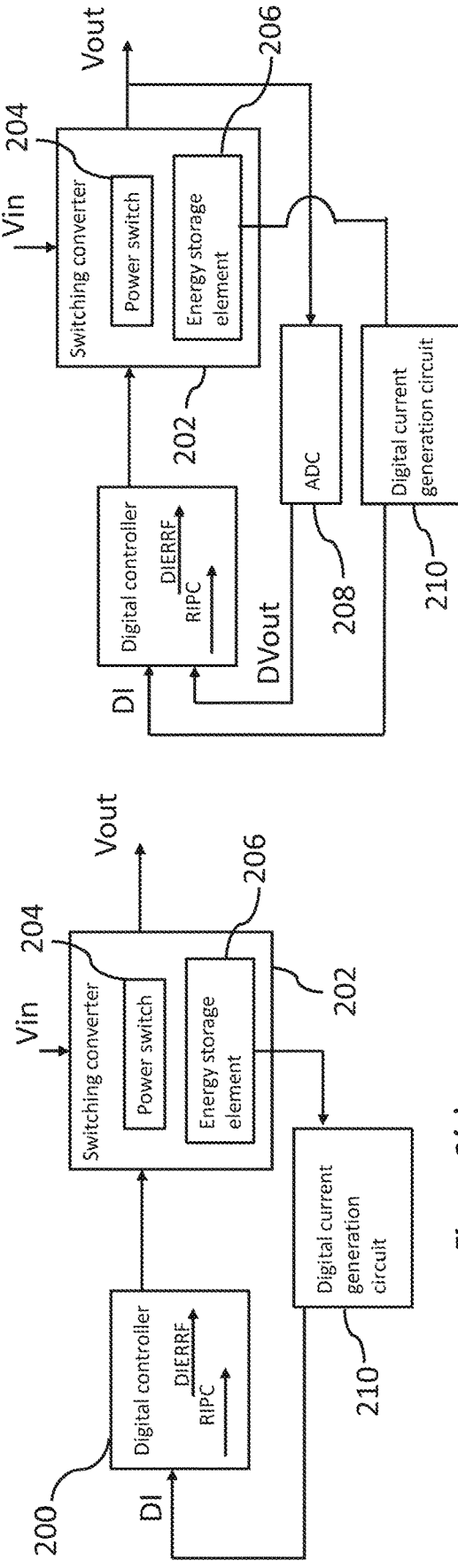
Figure 2(a)
Figure 2(b)
Figure 2(c)
Figure 2(d)

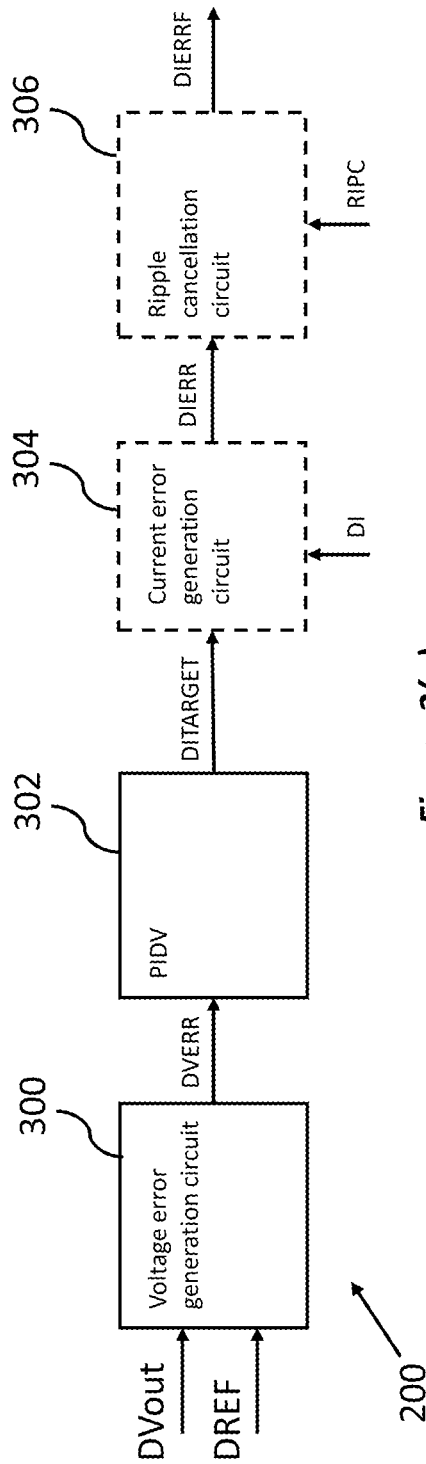
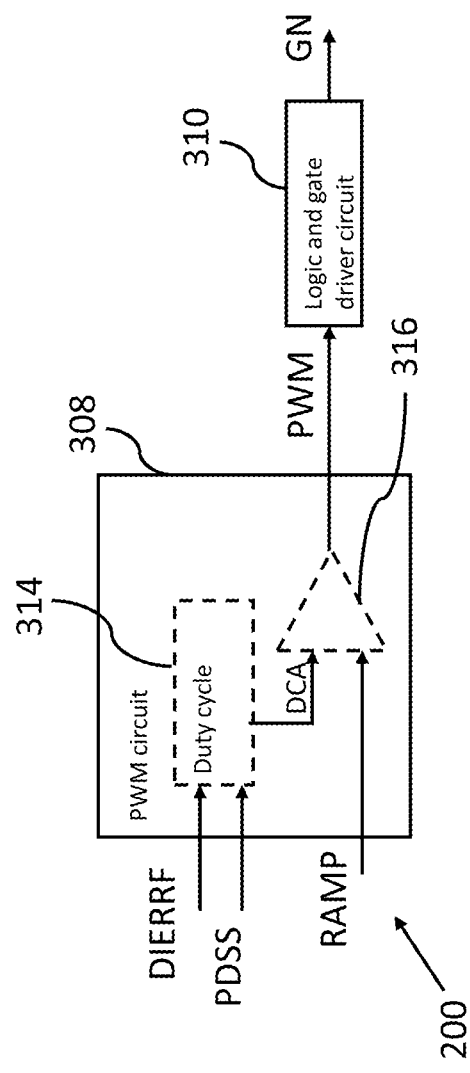
*Figure 3(a)*
*Figure 3(b)*

DIGITAL CONTROLLER

The present disclosure relates to a digital controller. In particular, the present disclosure relates to a digital controller for a switching converter.

BACKGROUND

FIG. 1(a) is a schematic of a digital buck converter 100 with analog to digital converters (ADC) 102, 104, 106 and a controller 108. The buck converter 100 comprises switches 110, 112, an inductor 114 and a capacitor 116. During operation, the switching converter receives an input voltage VIN and generates and output voltage VOUT.

While the power stage and passive components (the inductor 114 and the capacitor 116) remain the same as for an analog buck converter, the ADC 102 converts the output voltage VOUT into a digital number. This conversion is undertaken at a given rate in the time domain: every e.g. 1 µs, the VOUT digital number is updated.

Optionally, the inductor current IL of the inductor 114, and the input voltage VIN can also be converted from analog to digital, depending on the digital control method.

We distinguish:

The switching frequency (FSW) of the buck converter 100, for example 2 MHz. FSW is equal to 1/TSW, where TSW is the switching period of the buck converter 100. FSW is the frequency of the power stage.

The processing frequency of the digital controller 108 (FS), for example about 100 MHz. FS is equal to 1/TS, where TS is the processing period of the controller 108. FS can also optionally be the sampling frequency of ADC 102.

FIG. 1(b) is a schematic of a digital average current mode buck converter 118, with control circuitry 120.

Operation of the circuit of FIG. 1(b) is as follows:

The output voltage VOUT is digitized through the ADC 102 to give a digitized output voltage signal DOUT. The digitized output voltage signal DOUT is compared to a digital reference voltage DREF that corresponds to the target voltage for the output voltage VOUT. Both numbers DOUT, DREF can be e.g. 8-bit bus, where the digital code [0; 255] corresponds to the analog range [0.50V; 1.50V].

A digital error voltage signal DVERR is equal to DREF-DOUT, which is provided into a digital loop control proportional-integral-derivative (PID) circuit 122 to convert this digitized error voltage DVERR into a digital target current DITARGET, which is a digital number that is the target to set for the analog inductor current IL. Thus, if the output voltage VOUT decreases, then the digitized output voltage signal DOUT decreases, the digital error voltage signal DVERR increases and the digital target current DITARGET increases: the digital control PID 122 requests more inductor current IL to restore the output voltage VOUT.

The digital target current DITARGET may be coded on more bits, e.g. 16 bits, as well as the following signals. The inductor target current DITARGET enters an "inner loop" made of (a digital current generation circuit 123; a PIDI circuit 124; a PWM circuit 126 and the power-stage 100). This inner loop adjusts the duty-cycle MAG/DEMAG such that the analog inductor current IL matches its digital counterpart inductor current target DITARGET on average.

The digital current generation circuit 123 may be the ADC 104 as shown in FIG. 1(a) or may be a "synthesizer", so it can reproduce, in digital, the inductor current IL-behavior depending on the input voltage VIN, the output voltage VOUT, the duty-cycle and possibly other parameters.

The inner loop operates as follows: if the digital target current DITARGET is higher than the digital inductor current DIL, the digital current error DIERR increases. The digital current error DIERR passes through an integrator (PID 124) to generate a filtered and amplified version, being the filtered digital current error DIERRF which increases and enters a Digital-to-Duty converter (the PWM circuit 126) to increase the duty-cycle. This results in an increase in the inductor current IL.

The control circuitry 120 also comprises addition/subtraction circuits 128, 130 and the logic and gate driver circuit 132.

Once the inner loop has settled to a steady state, the average digital target current is equal to the average digital inductor current, which may be denoted as follows:

$$\langle DITARGET \rangle = \langle DIL \rangle \qquad (1)$$

A variable enclosed by "< >" is used to denote an average of the variable. For example, <x> denotes the average of the variable x.

FIG. 1(c) is a graph showing the transient response of the digital buck converter 100. A trace 134 shows the output voltage VOUT; a trace 136 shows the digital target current DITARGET; a trace 138 shows the digital inductor current DIL; a trace 140 shows the digital current error DIERR; a trace 142 shows the filtered digital current error; a trace 144 shows a duty cycle DUTY. The digital inductor current DIL is the inductor current IL after digitisation.

To simplify the explanation, FIG. 1(c) is in the continuous time and data domain (as if it was analog rather than digital).

We imagine a load that drops the output voltage VOUT at the end of the slot T0.

The regulation then increases the digital target current DITARGET to pull the output voltage VOUT back up. This spontaneously increases the digital current error DIERR (which has this residual ripple inherited from DIL (because DIERR=DITARGET-DIL).

The filtered digital current error DIERRF slowly increases after the transient. At one point, the duty-cycle is re-adjusted for the following period (sampling effect), and it allows the inductor current IL (and therefore the digital inductor current DIL) to increase, thus reducing the error digital current error DIERR until the average of the digital inductor current DIL corresponds to the desired target digital inductor current DITARGET=2 A (at the end of T2).

It can be observed that the filtered digital current error DIERRF takes a long time to vary, such that the decision for adjusting the duty-cycle is delayed. This degrades the reaction time of the buck converter 100. Specifically, the time T1 during which VOUT could further decrease, was not used.

SUMMARY

It is desirable to provide a digital controller that improves the reaction time of a switching converter, such as a digital buck converter, in response to a load transient.

According to a first aspect of the disclosure there is provided a digital controller for a switching converter configured to receive an input voltage and to generate an output voltage, the switching converter comprising one or more power switches and an energy storage element, the digital controller being configured to receive a digitized current signal, the digitized current signal being a digital representation of a current flow through the energy storage element, generate a filtered digital current error signal using the digitized current signal and a ripple cancellation signal, the ripple cancellation signal being arranged to reduce ripple from the digital current signal in the generation of the filtered digital current error signal, and control the switching converter, the control of the switching converter being dependent on the filtered digital current error signal.

Optionally, the switching converter is a buck converter, a boost converter or a buck-boost converter.

Optionally, the energy storage element is an inductor.

Optionally, the one or more power switches comprises a first power switch and a second power switch.

Optionally, the digital current signal is received from a digitized current generation circuit.

Optionally, the digital current generation circuit comprises a first analog to digital converter that is configured to sense the current flow through the energy storage element and to digitize the sensed current flow to generate the digital current signal.

Optionally, the digital current generation circuit comprises a current synthesizer.

Optionally, the digital controller is configured to receive a digitized output voltage signal, the digitized output voltage signal being a digital representation of the output voltage of the switching converter.

Optionally, the digitized output voltage signal is received from a second analog to digital converter that is configured to receive the output voltage and to digitize the output voltage to generate the digitized output voltage signal.

Optionally, the digital controller is configured to generate a digital target current signal using the digitized output voltage signal.

Optionally, the digital controller comprises a first voltage error generation circuit configured to use the digitized output voltage signal and a digital voltage reference signal to generate a digital error signal, and a proportional-integral-derivative circuit configured to convert the digital error signal into the digital target current signal.

Optionally, the first voltage error generation circuit is configured to generate the digital error signal by subtracting the digitized output voltage signal from the digital voltage reference signal.

Optionally, the digital controller comprises a first current error generation circuit configured to use the digital target current signal and the digital current signal to generate an unfiltered digital current error signal, and a ripple cancellation circuit configured to receive the unfiltered digital current error signal and the ripple cancellation signal, and generate the filtered digital current error signal by using the ripple cancellation signal to reduce the ripple of the unfiltered digital current error signal.

Optionally, the first current error generation circuit is configured to generate the unfiltered digital current error signal by subtracting the digital target current signal from the digital current signal.

Optionally, the ripple cancellation circuit is configured to generate the filtered digital current error signal by adding the unfiltered digital current error signal to the ripple cancellation signal.

Optionally, the digital controller comprises a pulse width modulation circuit configured to generate a PWM signal using the filtered digital current error signal, and a logic and gate driver circuit configured to receive the PWM signal and to generate a gate driving signal for each of the one or more power switches using the PWM signal.

Optionally, the pulse modulation circuit comprises a duty cycle signal generation circuit configured to generate a digital signal using the filtered digital current error signal and an offset signal, and a comparator configured to receive the digital signal and a ramp signal, and to output the PWM signal based on a comparison between the digital signal and the ramp signal.

Optionally, the comparator is configured to generate the PWM signal comprising rising and falling edges that are dependent on the digital signal crossing the ramp signal.

Optionally, the offset signal is dependent on a duty cycle of the switching converter and a maximum value of the ramp signal.

According to a second aspect of the disclosure there is provided a method of controlling, using a digital controller, a switching converter configured to receive an input voltage and to generate an output voltage, the switching converter comprising one or more power switches and an energy storage element, the method comprising receiving a digitized current signal, the digitized current signal being a digital representation of a current flow through the energy storage element, generating a filtered digital current error signal using the digitized current signal and a ripple cancellation signal, the ripple cancellation signal being arranged to reduce ripple from the digital current signal in the generation of the filtered digital current error signal, and controlling the switching converter, the control of the switching converter being dependent on the filtered digital current error signal.

It will be appreciated that the method of the second aspect may include features set out in the first aspect and can incorporate other features as described herein.

According to a third aspect of the disclosure there is provided a digital controller for a switching converter configured to receive an input voltage and to generate an output voltage, the switching converter comprising one or more power switches and an energy storage element, the digital controller comprising a ripple cancellation signal generator configured to generate a ripple cancellation signal, the digital controller being configured to receive a digitized current signal, the digitized current signal being a digital representation of a current flow through the energy storage element, generate a filtered digital current error signal using the digitized current signal and the ripple cancellation signal, the ripple cancellation signal being arranged to reduce ripple from the digitized current signal in the generation of the filtered digital current error signal, and control the switching converter, the control of the switching converter being dependent on the filtered digital current error signal, wherein the ripple cancellation signal, within each signal period, comprises a rising slope comprising a first non-linear portion, and/or a falling slope comprising a second non-linear portion.

Optionally, the digital controller comprises sampling circuitry configured to sample the digital current signal, wherein the ripple cancellation signal generator is configured to generate the ripple cancellation signal using the sampled digital current signal.

Optionally, the ripple cancellation signal generator is configured to receive a clock signal, the clock signal being a periodic digital signal having a switching frequency that is derived from the switching frequency of the switching converter, and generate the ripple cancellation signal using the clock signal, wherein the signal period of the ripple cancellation signal is equal to the period of the clock signal.

Optionally, the switching frequency of the switching converter is controlled by the clock signal.

Optionally, the ripple cancellation signal generator is configured to generate the ripple cancellation signal by setting the ripple cancellation signal to zero at each transition of the clock signal.

Optionally, the ripple cancellation signal, within each signal period, comprises the rising slope comprising a first linear portion, and/or the falling slope comprising a second linear portion.

Optionally, the rising slope comprises the first linear portion rising linearly to zero, and the first non-linear portion rising non-linearly from zero, and the falling slope comprises the second linear portion falling linearly to zero, and the second non-linear portion falling non-linearly from zero.

Optionally, the digital controller comprises a pulse width modulation circuit configured to generate a PWM signal using the filtered digital current error signal, and a logic and gate driver circuit configured to receive the PWM signal and to generate a gate driving signal for each of the one or more power switches using the PWM signal, wherein the ripple cancellation signal generator is configured to generate the ripple cancellation signal using the PWM signal.

Optionally, the ripple cancellation signal generator configured to generate the ripple cancellation signal using the PWM signal by transition alternately between the rising slope and the falling slope at each transition of the PWM signal.

Optionally, the PWM signal comprises a magnetize state and a demagnetize state, and the ripple cancellation signal generator is configured to generate the ripple cancelation signal by generating the falling slope when the PWM signal is in the magnetise state and generating the rising slope when the PWM signal is in the demagnetize state.

Optionally, the energy storage element is an inductor having an inductance.

Optionally, the first linear portion of the rising slope is equal to the output voltage divided by the inductance and the second linear portion of the falling slope is equal to the output voltage minus the input voltage, divided by the inductance.

Optionally, the first non-linear portion has an inverse exponential growth profile and the second non-linear portion has an exponential decay profile.

Optionally, the ripple cancellation signal generator is configured to generate the ripple cancellation signal based on an operational state of the switching converter.

Optionally, the operational state of the switching converter is derived from the driving state of the switching converter and/or the actual state of the switching converter.

Optionally, the driving state is dependent on one or more PWM signals and/or the actual state is dependent on the switching state of the one or more power switches.

Optionally, the switching converter is a buck-boost converter and the driving state is dependent on two PWM signals.

Optionally, the digital controller comprises a pulse width modulation circuit configured to generate the one or more PWM signals using the filtered digital current error signal, and a logic and gate driver circuit configured to receive the one or more PWM signals and to generate a gate driving signal for each of the one or more power switches using the one or more PWM signals, wherein the ripple cancellation signal generator is configured to generate the ripple cancellation signal using the one or more PWM signals.

Optionally, the ripple cancellation signal generator configured to generate the ripple cancellation signal using the one or more PWM signals by transition alternately between the rising slope and the falling slope at each transition of at least one of the one or more PWM signals.

Optionally, each of the one or more PWM signals comprises a magnetize state and a demagnetize state, and the ripple cancellation signal generator is configured to generate the ripple cancelation signal by generating the falling slope when at least one of the one or more PWM signals is in the magnetise state and generating the rising slope when at least one of the one more PWM signals is in the demagnetize state.

According to a fourth aspect of the disclosure there is provided a method of controlling, using a digital controller, a switching converter configured to receive an input voltage and to generate an output voltage, the switching converter comprising one or more power switches and an energy storage element, the digital controller comprising a ripple cancellation signal generator configured to generate a ripple cancellation signal, the method comprising receiving a digitized current signal, the digitized current signal being a digital representation of a current flow through the energy storage element, generating a filtered digital current error signal using the digitized current signal and the ripple cancellation signal, the ripple cancellation signal being arranged to reduce ripple from the digitized current signal in the generation of the filtered digital current error signal, and controlling the switching converter, the control of the switching converter being dependent on the filtered digital current error signal, wherein the ripple cancellation signal, within each signal period, comprises a rising slope comprising a first non-linear portion, and/or a falling slope comprising a second non-linear portion.

It will be appreciated that the method of the fourth aspect may include features set out in the third aspect and can incorporate other features as described herein.

BRIEF DESCRIPTION OF THE DRAWINGS

The disclosure is described in further detail below by way of example and with reference to the accompanying drawings, in which:

FIG. 1(a) is a schematic of a digital buck converter, FIG. 1(c) is a graph showing the transient response of the digital buck converter;

FIG. 2(a) is a schematic of a digital controller for a switching converter in accordance with a first embodiment of the present disclosure, FIG. 2(b) is a schematic of a specific embodiment of the system shown in FIG. 2(a), FIG. 2(c) is a schematic of a further specific embodiment of the system shown in FIG. 2(a), FIG. 2(d) is a schematic of a further specific embodiment of the system shown in FIG. 2(a);

FIG. 3(a) is a schematic of a specific embodiment of the controller in accordance with a second embodiment of the present disclosure, FIG. 3(b) is a schematic of a specific embodiment of the controller in accordance with a third embodiment of the present disclosure;

DETAILED DESCRIPTION

Figure 1B:
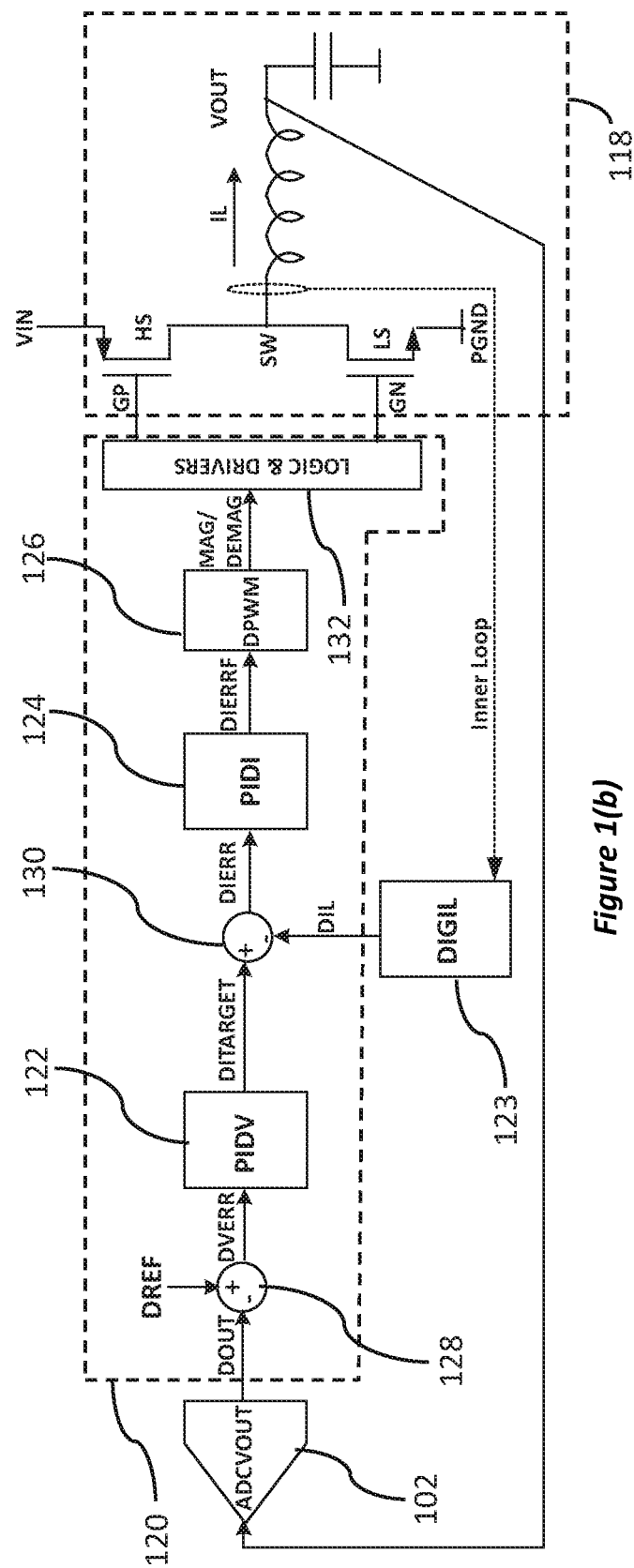
FIG. 1(b) is a schematic of a digital average current mode buck converter, with control circuitry.

In FIG. 1(b), the PID 124 functions as a low pass filter, and is used for the following reasons:

It is preferable that a gain is applied by the PID 124. For example, imagine we have a duty-cycle of 50%, we want an inductor current IL=1 A, and the block PWM circuit 126 needs an input filtered digital current error DIERRF between 0 and 15 to generate/control a duty-cycle in [0; 1]. If the PID 124 had a gain of 1, this means (DITARGET-DIL) would need to be 7 for getting the 50% duty-cycle. Thus, the target digital current DITARGET would need to be 8, for the digital inductor current DIL=1 A. We see the two values DITARGET and DIL would be very different. It is not a fundamental problem for the buck converter 100 to work, but we lose the benefit of having DITARGET~DIL (which could be useful for current limiter applied on DITARGET, among others). Applying the same calculation with a much greater PID 124 gain, leads to having DITARGET approximately equal to DIL, as is preferable.

The PID 124 must also filter the difference (DITARGET-DIL): indeed, it allows removal of the ripple on the error, inherited from the ripple on DIL.

Note that the buck converter 100 could survive with this unfiltered ripple. However, there are two drawbacks:
1. It may introduce subharmonic oscillations, thereby requiring caution when generating the duty-cycle.
2. We use DIERRF at one point of time to decide/set the duty-cycle. So, this is equivalent to a sampling. At this time, DIERRF can be 1 A away from the average DIERFF, which is equal to zero, because of this ripple. So, the inner loop may set the inductor current IL 1 A away from DITARGET on average. This results in the same problem as for the case of the PID 124 having a gain of 1, and we get an extra problem in case of multi-phases with asymmetric inductors.

Therefore, average current mode controllers have the PID 124 functioning as integrator, to avoid having these two issues.

However, the PID 124 functioning as an integrator, is slow to react, thereby leading to the issues in response to a load transient as described previously. In summary, the integrating effect of the PID 124 has a detrimental consequence: DIERRF takes longer to vary, and the decision for adjusting the duty-cycle is delayed. This degrades the reaction time of the buck converter 100.

FIG. 2(a) is a schematic of a digital controller 200 for a switching converter 202 in accordance with a first embodiment of the present disclosure. The switching converter is configured to receive an input voltage Vin and to generate an output voltage Vout. The switching converter 200 comprises one or more power switches 204 (illustrated by a single switch in the present example), and an energy storage element 206.

The digital controller 200 is configured to receive a digital current signal DI. The digital current signal DI is a digital representation of a current that is flowing through the energy storage element 206. The energy storage element 206 may, for example, be an inductor, such that the current flowing through the energy storage element 206 may correspond to the inductor current IL and digital current signal DI may correspond to the digital inductor current DIL, as discussed previously in relation to FIG. 1(b).

The digital controller 200 is further configured to generate a filtered digital current error signal DIERRF using the digital current signal DI and a ripple cancellation signal (RIPC). The ripple cancellation signal RIPC is arranged to reduce ripple from the digital current signal DI in the generation of the filtered digital current error signal DIERRF.

It will be appreciated that in a specific embodiment, the controller 200 may reduce the ripple partially, such that some ripple is still present on DIERRF. In an alternative embodiment, the controller 200 may reduce the ripple fully, such that ripple is removed in the generation of DIERRF.

The ripple results from the periodic charging and discharging of the energy storage element 206 during the switching operation of the switching converter 202. For example, for a buck converter, the ripple may be as described previously in relation to the operation of the inductor 114, and as illustrated in the traces 138, 140. The "ripple" in the example shown in FIG. 1(c) refers to the periodic variation having a triangular-type profile resulting from the switching operation of the buck converter 100.

The digital controller 200 is further configured to control the switching converter 202, with the control of the switching converter 202 being dependent on the filtered digital current error signal DIERFF.

In a specific embodiment, the switching converter 202 may, for example, be a buck converter, a boost converter or a buck-boost converter; and the energy storage element 206 may be an inductor.

The use of the ripple correction signal RIPC means that the ripple can be removed in the generation of the filtered digital current error signal DIERRF without the need for an integrated (as provided in FIG. 1(b) by the PID 124). Therefore, the present disclosure provides a controller that overcomes the shortcomings of the known systems that have a slow response due to the PID 124, whilst still maintaining the benefits of an average current mode of control.

FIG. 2(b) is a schematic of a specific embodiment of the system shown in FIG. 2(a). In the present embodiment, the digital controller 200 is configured to receive a digitized output voltage DVout. The digitized output voltage signal DVout is a digital representation of the output voltage Vout of the switching converter 202. The digitized output voltage signal DVout is generated using an analog to digital converter (ADC) 208 that receives the output voltage Vout and digitises the output voltage Vout to provide the digitized output voltage signal DVout. The digitized output voltage signal DVout may be used to generate a digital target current signal DITARGET (not shown).

FIG. 2(c) is a schematic of a further specific embodiment of the system shown in FIG. 2(a). In the present embodiment, the digital current signal DI is received from a digital current generation circuit 210. The digital current generation circuit 210 may, for example, comprise an analog to digital converter that is configured to sense the current flow through the energy storage element 206 and to digitize the sensed current flow to generated the digital current signal DI. In a further embodiment, the digital current generation circuit 210 may comprise a current synthesiser.

FIG. 2(d) is a schematic of a further specific embodiment of the system shown in FIG. 2(a) that includes features that have been previously described in relation to FIGS. 2(b) and 2(c).

FIG. 3(a) is a schematic of a specific embodiment of the controller 200 as may be used in any of the embodiments described herein, in accordance with the understanding of the skilled person, and in accordance with a second embodiment of the disclosure.

The controller 200 comprises a voltage error generation circuit 300 configured to use the digitized output voltage signal DVout and a digitized voltage reference signal DREF to generate a digital error signal DVERR.

The voltage error generation circuit 300 may be configured to generate the digital error signal DVERR by subtracting the digitized output voltage signal DVout from the digitized voltage reference signal DREF, which may be represented as follows:

$$DVERR = DREF - DVout \qquad (2)$$

The controller 200 further comprises a proportional-integral-derivative circuit (PID) 302 configured to convert the digitized voltage error signal DVERR into the digital target current signal DITARGET.

The controller 200 may further comprise a current error generation circuit 304 that is configured to use the digital target current signal DITARGET and the digitized current signal DI to generate an unfiltered digital current error signal DIERR.

The current error generation circuit 304 may be configured to generate the unfiltered digital current error signal DIERR by subtracting the digital target current signal DITARGET from the digital current signal DI, as follows:

$$DIERR = DI - DITARGET \qquad (3)$$

The controller 200 may further comprise a ripple cancellation circuit 306 configured to receive the unfiltered digital current error signal DIERR and the ripple cancellation signal RIPC and to generate the filtered digital current error signal DIERRF by using the ripple cancellation signal RIPC to reduce the ripple of the unfiltered digital current error signal DIERR.

The ripple cancellation circuit 306 may be configured to generate the filtered digital current error signal DIERRF by adding the unfiltered digital current error signal DIERR to the ripple cancellation signal RIPC, as follows:

$$DIERRF = DIERR + RIPC \qquad (4)$$

FIG. 3(b) is a schematic of a specific embodiment of the controller 200 as may be used in any of the embodiments described herein, in accordance with the understanding of the skilled person, and in accordance with a third embodiment of the disclosure.

In the present example, the controller 200 comprises a pulse width modulation (PWM) circuit 308 configured to generate a PWM signal (denoted as "PWM" in the Figures) using the filtered digital current error signal DIERRF. The digital current error signal DIERRF may be received from the components as described in relation to the specific embodiment shown in FIG. 3(a), in accordance with the understanding of the skilled person.

The controller 200 further comprises a logic and gate driver circuit 310 configured to receive the PWM signal and to generate a gate driving signal GN for each of the one or more power switches 204 using the PWM signal.

It will be appreciated that the single gate driving signal GN is for illustrative purposes. In practice, and when applied to a switching converter having a high side FET and a low side FET, specifically when applied to a buck converter for the present example, when PWM=0, the low-side FET is turned ON by a gate driving signal; and when PWM=1, the high-side FET is turned ON by a gate driving signal.

Furthermore, the logic and gate driver circuit may comprise a driver component for generating the driving signals; and a logic component for providing a break-before-make operation to handle the swap between high-side and low-side.

The PWM circuit 308 may further comprise a duty cycle signal generation circuit 314 configured to generate a digital signal DCA using the filtered digital current error signal DIERRF and an offset signal PDSS.

In a specific embodiment, the digital signal DCA may be as follows:

$$DCA = DIERRF + PDSS \quad (5)$$

The PWM circuit 308 may further comprise a comparator 316 configured to receive the digital signal DCA and a ramp signal RAMP, and to output the PWM signal based on a comparison between the digital signal DCA and the ramp signal RAMP.

The comparator 316 may be configured to generate the PWM signal such that the PWM signal comprises rising and falling edges that are dependent on the digital signal DCA crossing the ramp signal RAMP.

It will be appreciated that the comparator 316 is functionally a comparator, but its resolution in time domain is increased using one or more DLL's.

For example, if the clock frequency FS was 100 MHz with a straight comparator, the time resolution for PWM would be 10 ns because in digital, the comparator would update PWM every 10 ns. In reality, the comparator 316 follows the scheme in the FIG. 5(e): comparison of digital slopes on DCA and RAMP, and generation of an accurate time for the PWM duration (much finer than 10 ns) using the DLL. In further embodiments the functionality of the comparator 316 may be provided by more than one comparator.

The offset signal PDSS may be dependent on a duty cycle D of the switching converter 202 and a maximum value of the ramp signal RMAX. For example, if the ramp signal RAMP varies from 0 to RMAX, PDSS can be calculated graphically, if we want the duty cycle D, as follows:

$$PDSS = (1 - D) \cdot RMAX \quad (6)$$

Figure 5A:
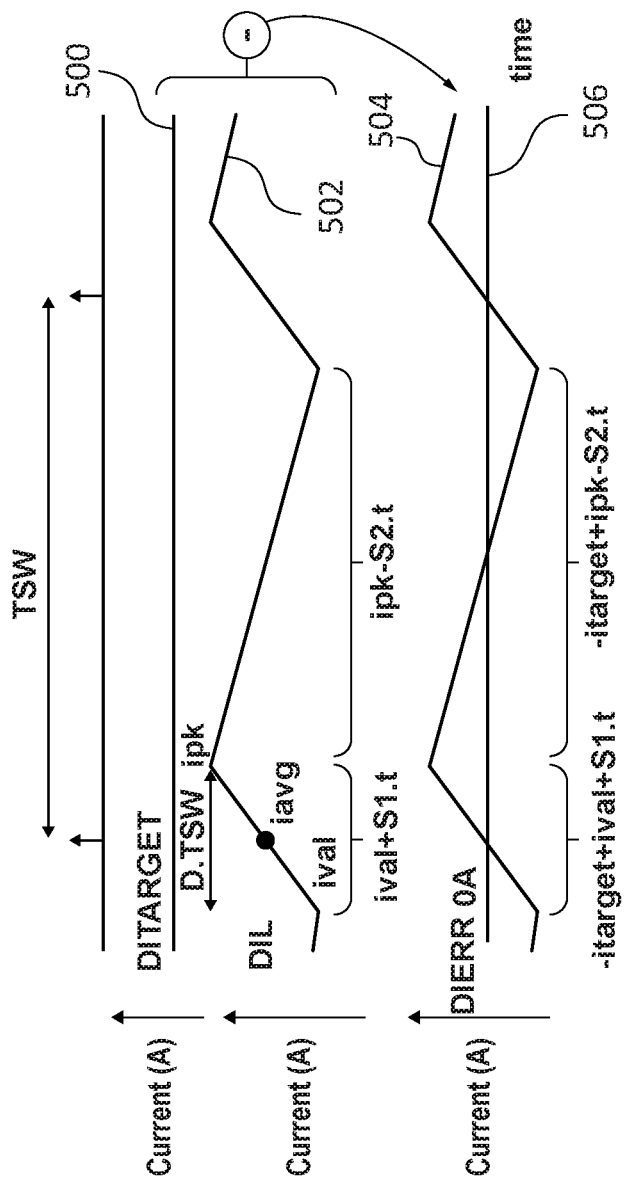
FIG. 5(a) is a time graph showing simulation results of a practical implementation of the system shown in FIG. 4.
Figure 5B:
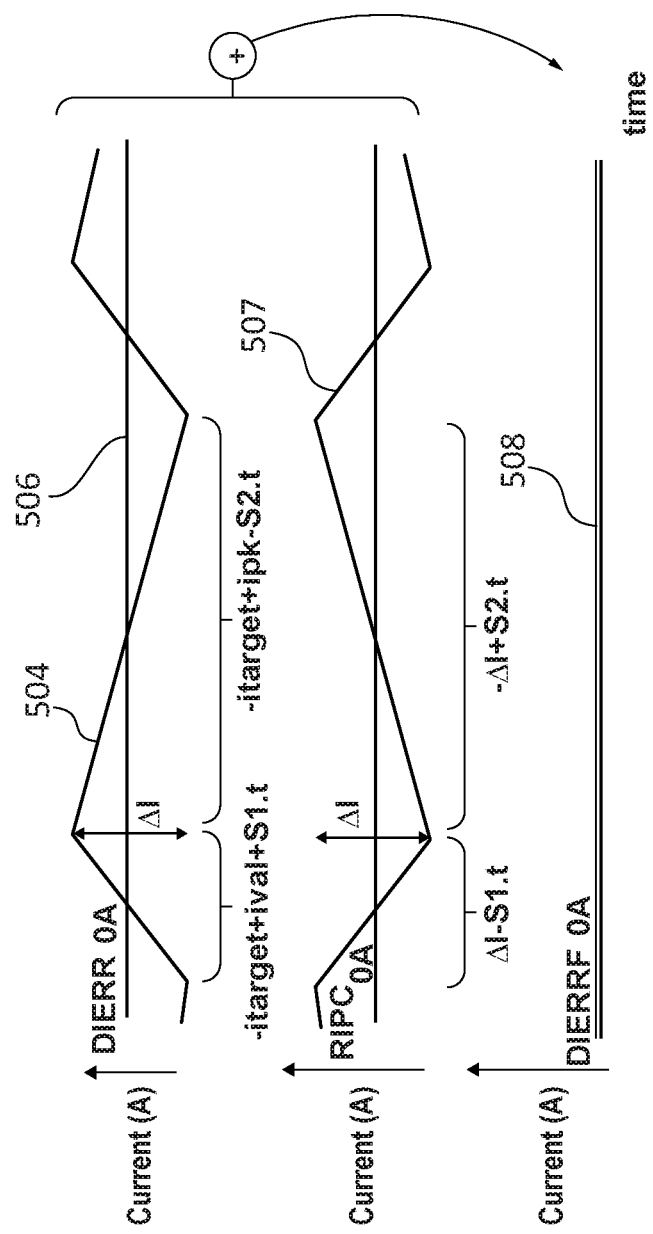
FIG. 5(b) is a further time graph showing simulation results of a practical implementation of the system shown in FIG. 4.
Figure 5C:
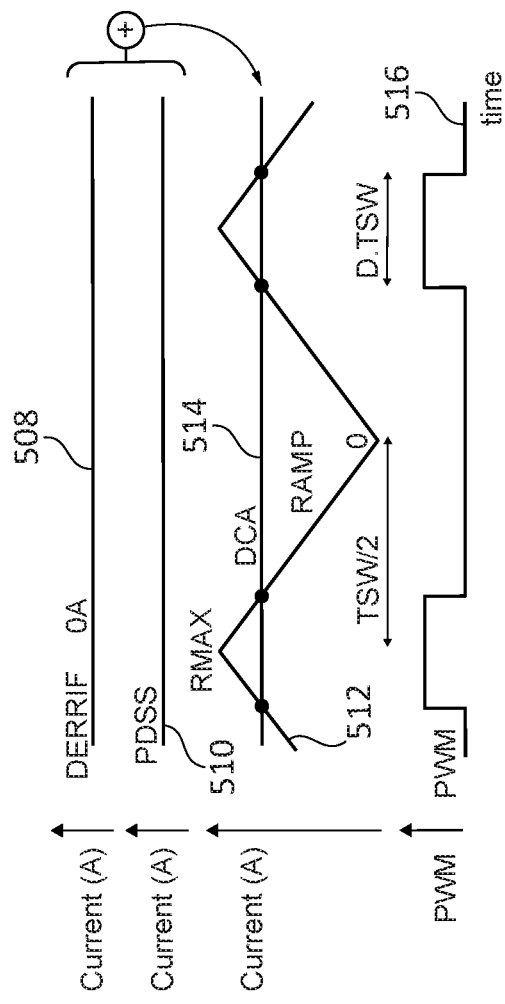
FIG. 5(c) is a further time graph showing simulation results of a practical implementation of the system shown in FIG. 4.

It will be appreciated that equation (6) is valid in the case of FIG. 5(c) where RAMP is a triangular signal. In further embodiments, where RAMP has a different profile, will be different but easily derivable graphically by the skilled person.

For an embodiment where the switching converter 202 is a buck converter, equation (6) may be rewritten as follows:

$$PDSS = (1 - Vout/Vin) \cdot RMAX \quad (7)$$

Figure 4:
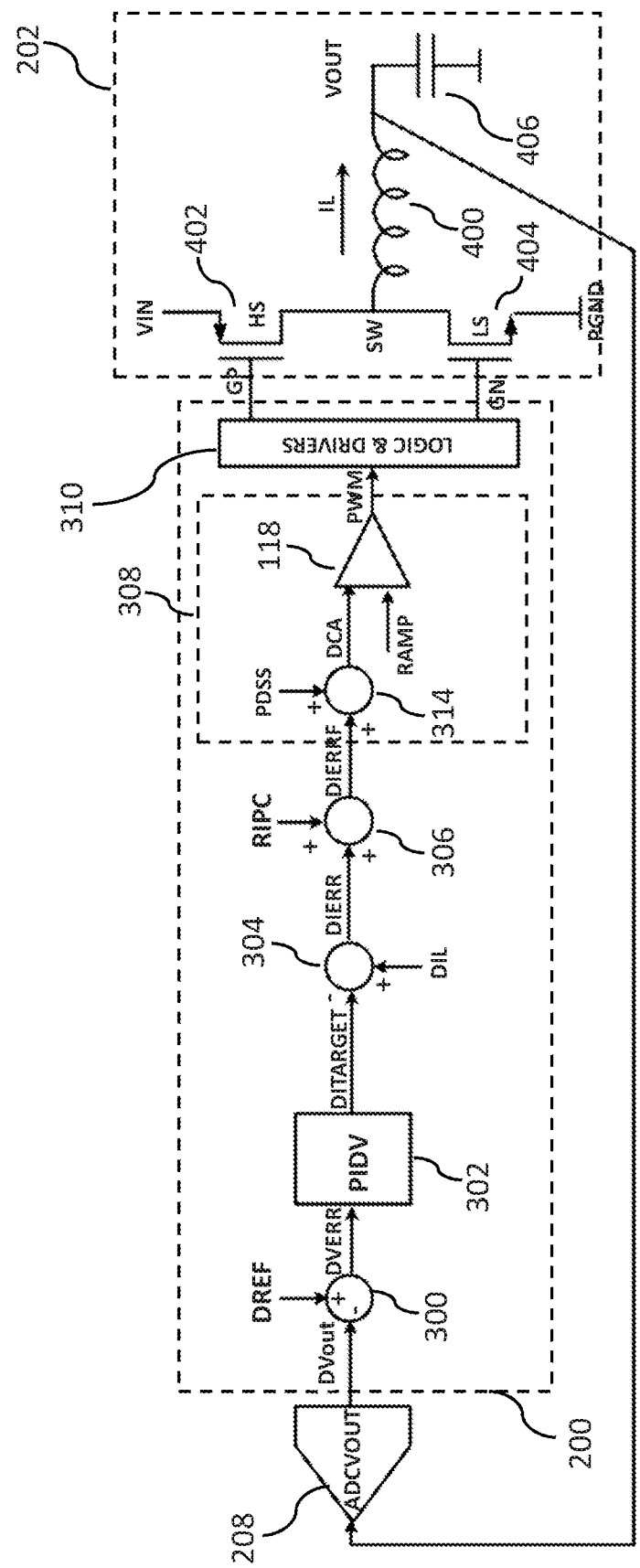
FIG. 4 is a schematic of a specific embodiment of the system of the present disclosure in accordance with a fourth embodiment of the present disclosure.

FIG. 4 is a schematic of a specific embodiment of the system of the present disclosure, where the switching converter 202 comprises a buck converter, and in accordance with a fourth embodiment of the present disclosure. The buck converter comprises an inductor 400, two power switches 402, 404 and an output capacitor 406, and uses current-mode control. The logic and gate driver circuit 310 outputs two gate drive signals GP, GN with each signal being provided to one of the power switches 402, 404. The logic and gate driver circuit 310 may also include a non-overlap system ("break before make" as discussed previous) provided by the logic circuitry. The components 300, 304, 306 may be adders and/or subtractors in accordance with the understanding of the skilled person.

FIG. 5(a) is a time graph showing simulation results of a practical implementation of the system shown in FIG. 4. There is shown a trace 500 of the digital target current signal DITARGET; a trace 502 of the digital inductor current DIL; and a trace 504 of the unfiltered digital current error DIERROR.

FIGS. 5(a), 5(b) and 5(c) use continuous time and continuous data domain for the timing diagrams for clarity purposes.

In the present example, the energy storage element 206 is an inductor and therefore the digital current signal DI, is the digitized inductor current DIL.

It is desirable to have the average digital target current equal to the average digital inductor current, as described by equation (1). As can be observed in FIG. 5(a), the system is currently in this desired steady state over one period of time (denoted by TSW), as a trace 506, showing the average of the digital current error DIERR is 0 A over the period.

It can be observed that the unfiltered digital current error DIERR inherits all the ripple of the digital inductor current DIL, assuming that digital current target DITARGET is constant.

S1 and S2 are the slopes of this ripple and are straight from DIL. S1, S2 can be either constant, typically (Vin−Vout)/L and −Vout/L for a buck converter, where "L" denotes the inductance of the inductor 206. However, the slopes S1, S2 may be non-constant. Furthermore, the slopes S1, S2 may be exponential, for example due to the serial resistances in the power stage and/or the inductor de-rating. In the present disclosure we assume that S1 and S2 are always known and can be compensated. S1 may follow IMAX (1−expt(−t/T)) where T=L/R and IMAX=(VIN−VOUT)/Rswitch.

FIG. 5(b) is a further time graph showing simulation results of a practical implementation of the system shown in FIG. 4. There is shown a trace 507 of the ripple cancellation signal RIPC; and a trace 508 of the filtered digital current error DIERRF.

The ripple cancelation signal RIPC has the opposite slopes to the digital current error DIERR and is centred around zero.

As the digital current error DIERR is a digital slope, and assuming its values are perfectly known over the time, the ripple cancellation signal RPIC can be generated with opposite polarity and with the same digital numbers in absolute value.

That way, the sum of DIERR and RIPC (as provided by equation (4)) results in the mathematical removal of the ripple. Therefore, due to the digital processing, we can achieve the ripple removal without the need to have the PID 124.

FIG. 5(c) is a further time graph showing simulation results of a practical implementation of the system shown in FIG. 4. There is shown a trace 510 of the offset signal PDSS; a trace 512 of the ramp signal RAMP; a trace 514 of the digital signal DCA; and a trace 516 of the PWM signal. PDSS denotes a predictive offset to obtain a steady state duty cycle (DSS). The relationship between the parameters shown in FIG. 5(c) is given by equation (5).

Note that (DIL-DITARGET) is generated rather than (DITARGET-DIL) to satisfy the final modulation scheme (see FIG. 5(c)). Further embodiments may generate DITARGET-DIL in accordance with the understanding of the skilled person.

As discussed previously in relation to FIG. 1(a), the average current mode offers a gain (infinite at 0 Hz because the PID 124 is an integrator), to maintain average DITARGET and average DIL as being substantially equal.

Generation of DIERRF using the ripple cancellation signal RIPC, as provided by equation (4) is an operation having a gain of 1.

The duty-cycle D (shown by the PWM signal) is generated by the crossings of the digital signal DCA versus a triangular ramp RAMP. In the present example, this is achieved by a dual leading/trailing edge: the PWM signal (which is MAGNETIZE) does not have its rising edge synchronized by a clock ("trailing edge modulation") or its falling edge synchronized by a clock ("leading edge modulation"). Instead, both rising/falling edges of PWM are determined by DCA crossing RAMP.

The digitized version of Vin and Vout may be used to create the offset signal PDSS, in accordance with equation (7). An analog to digital converter may be used to detect the input voltage Vin, to digitize Vin, and to generate a digital signal that is representative of Vin. DVout may be generated as previously described, and in accordance with the understanding of the skilled person.

The method of duty cycle control using the offset signal PDSS means that the required duty cycle D can be achieved within acceptable tolerances for practical applicability whilst keeping the average of the filtered digital current error DIERRF as equal to zero such that the average DITARGET is equal to the average DIL.

This method that may be called DSS (Steady-State Duty-Cycle) as is referenced in literature "An Estimative Current Mode Controller for DC-DC Converters Operating in Continuous Conduction Mode, IEEE paper by Mehdi Ferdowsi", which used a different method from the present disclosure and did not use leading/trailing edge operations.

The benefits of both rising/falling edges being determined by crossing of DCA and RAMP are:

When Vout varies, this is propagated to DITARGET that changes the level of DCA (after ripple removal). It can do it all the way until the crossing DCA/RAMP, so the sampling effect is no longer at the beginning of a period like in a DPWM as described in FIGS. 1(a), (b) and (c). Any sudden change of Vout can modify the PWM rising time all the way until just TS before this crossing.

The PWM falling edge is re-evaluated until DCA crosses RAMP. We thus get two evaluations/sampling in one TSW period. This results in improvements in relation to bandwidth when compared to the system using only leading edge modulation.

Figure 5E:
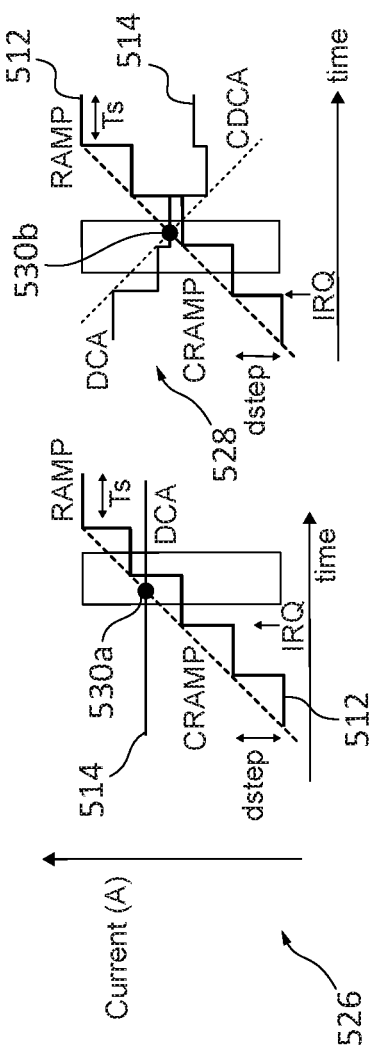
FIG. 5(e) is a graph showing a cross over point for the digital signal and the ramp signal.
Figure 5D:
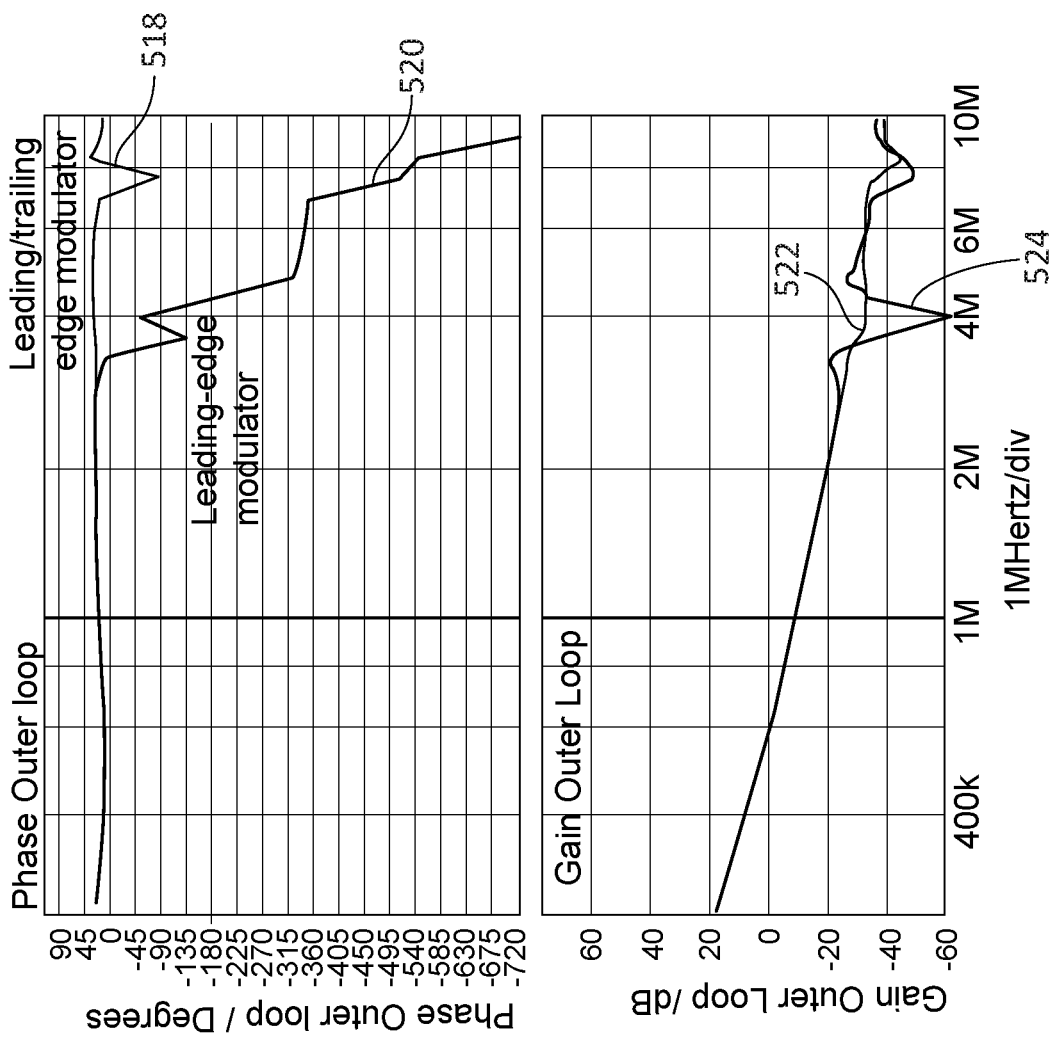
FIG. 5(d) is a graph showing simulation results of a phase response and a gain response for a practical implementation of the circuit of FIG. 4.

FIG. 5(d) is a graph showing simulation results of a phase response and a gain response for a practical implementation of the circuit of FIG. 4 and a circuit using only leading edge modulation. A trace 518 is a phase response of the circuit of FIG. 4; a trace 520 is a phase response of the circuit using only leading edge modulation; a trace 522 is a gain response of the circuit of FIG. 4; and a trace 524 is a gain response of the circuit using only leading edge modulation. The circuit of FIG. 4 shows an improvement in bandwidth, as previously discussed, when compared to the circuit using only leading edge modulation.

The following discussion relates to discrete time considerations. To meet the requirements of mobile communication, the duty-cycle resolution is typically ~200 ps. To achieve this resolution, normally a 5 GHz clock would be required, which would lead the digital control to consume too much power. Two solutions are well known:

Dithering: Dithering is applicable to DPWM, such as in FIG. 1(b), and would enforce a sampling of the coarse duty-cycle only once every TSW. We therefore would lose the benefit of DCA/RAMP crossing re-evaluation every TS.

Local high clock domain for fine resolution. Although it was used in U.S. Pat. No. 9,419,627B2 and U.S. Pat. No. 9,667,260B2, the needs for mobile communication are 30× finer and the required 5 GHz would still induce too much consumption.

Embodiments of the present disclosure use a local delay locked loop (DLL) as a fine resolution. It may be used for both leading and trailing edges. DLLs may enable slope-based intersection calculations for leading/trailing edges. More than one DLL can be used, for example to reset and lock one DLL while the other one is being used. In a specific embodiment, where more modulators are needed (multiphases), there is preferably one or more dedicated DLLs for each phase.

FIG. 5(e) is a graph 526 showing a cross over point for the digital signal DCA and the ramp signal RAMP, where DCA is constant ("flat"); and a graph 528 for the digital signal DCA and the ramp signal RAMP, where DCA is sloped.

In FIG. 5(e), DCA and RAMP are shown in the digital discrete time domain: they vary at the rate TS, which is e.g. 10 ns. The following two cases are shown:

Graph 526. "Flat" constant DCA: the DIL-induced ripple was perfectly cancelled and the average digital current target was constant itself.

Graph 528. Sloped DCA: although the DIL-induced ripple was removed, residual ripple on the average digital current target itself still shows on DCA.

In both cases, on each rising step of RAMP (or falling edge when RAMP decreases), the equivalent slope is calculated as if in continuous time (dotted lines). Then the intersection point in time of the two slopes is calculated (labelled 530a in graph 526 and 530b in graph 528). At one point in time, labelled "IRQ", the calculation shows that in the shadowed interval [TS/2, 3TS/2], the continuous time slopes will cross, and the crossing time is known.

In the present example, the DLL splits the TS=10 ns into 64 sections and is programmed to the required value. For example, at "IRQ", the slopes will cross 8.3 ns later: referred to the time interval from TS/2 to 3TS/2. This corresponds to 3.3 ns when started from TS/2. The DLL code is calculated as (3.3 ns/10 ns) multiplied by 64 which is equal to 21.

Figure 5G:
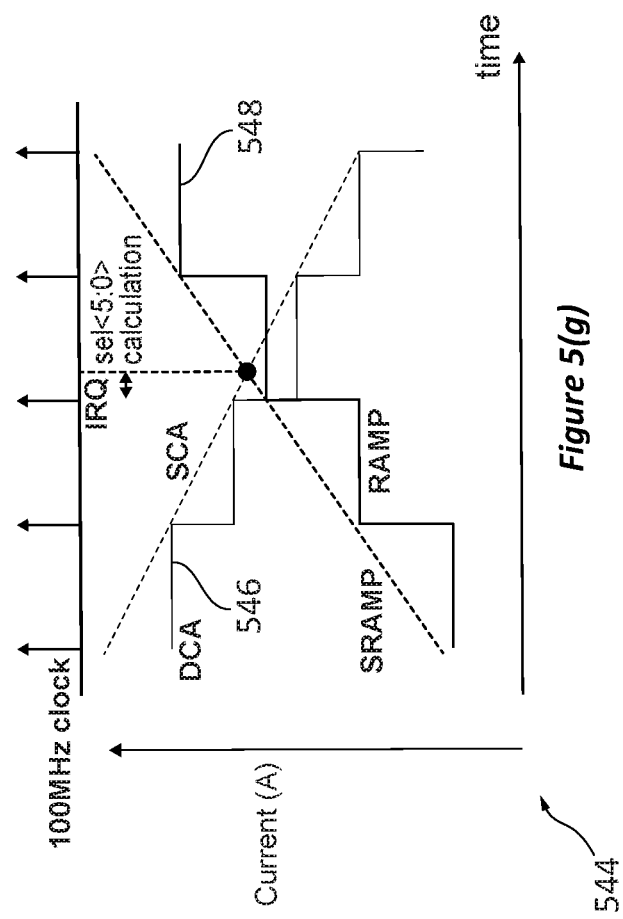
FIG. 5(g) is a graph showing a cross over point for the digital signal and the ramp signal.
Figure 5F:
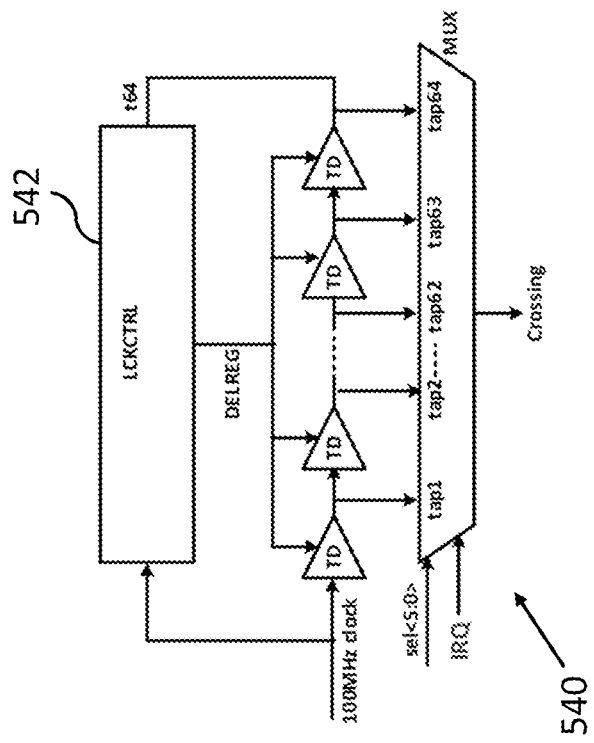
FIG. 5(f) is a schematic of an example of a local delay locked loop (DLL) as may be implemented in any of the embodiments described.

FIG. 5(f) is a schematic of an example of a DLL 540 as may be implemented in any of the embodiments described herein, in accordance with the understanding of the skilled person.

The DLL 540 injects the 100 MHz clock into a string of e.g. 64 delays TD. A control block 542 LCKCTRL compares the output of string "t64" to the next edge of the 100 MHz clock, which comes 10 ns later. If t64 comes after this next edge, this means 64×TD exceeds 10 ns.

The block 542 LCKCTRL adjusts a controlling signal (either analog or digital) to make the delays TD faster. If t64 comes before the next 100 MHz edge, this means 64×TD is shorter than 10 ns. In this case, the block 542 LCKCTRL makes the delays longer through DELREG. Finally, after a few 100 MHZ cycle, the controller 542 LCKCTRL ensures that 64×TD=10 ns. The DLL 540 is "locked", and TD~160 ps=10 ns/64.

We see now that by selecting one tap using the MUX and the selection code sel<5:0>, we get the signal crossing as a fraction N/64 of the 10 ns clock. The DELREG and more generally the system can be analog or digital.

FIG. 5(g) is a graph 544 showing a cross over point for the digital signal DCA 546 and the ramp signal RAMP 548. We use sel<5:0> and IRQ for the crossing DCA versus RAMP.

Some examples shown herein present DCA and RAMP, with their counterparts being SCA and SRAMP, respectively, in the continuous time domain.

In digital, every clock period (e.g. 100 MHz), we inspect DCA and RAMP: we calculate their continuous time equivalent SCA and SRAMP and check if they will cross in the next period. If this is the case, the digital controller (equivalent to the block 316 in FIG. 4, which may provide additional functionality beyond a typical comparator) calculates the crossing point in the continuous time domain, and digitizes it as the code sel<5:0>. In the FIG. 5(g), the crossing is at ¼ of TS=10 ns, so the code will be 16 (64/4) and it is sent to the DLL 540.

Also, an interruption IRQ is sent to instruct the DLL 540 to output the signal crossing. This fine tuning will generate crossing 2.5 ns after IRQ, which corresponds to ¼ of the full Ts=10 ns period. The signal "crossing" in this case starts PWM through an RS latch, for example.

In a specific embodiment, the crossing may be predicted even further ahead: we do not check if the crossing is within the next period, but rather within the next period plus half or one full clock cycle, as is shown in FIG. 5(e). In FIG. 5(e) IRQ is flagged when the crossing occurs in the shadowed area, which is not immediately after, but is delayed by half a cycle. The reason for the delay is because we allocate this time to calculate, in digital the code_sel<5:0> (propagation through gates).

Figure 6:
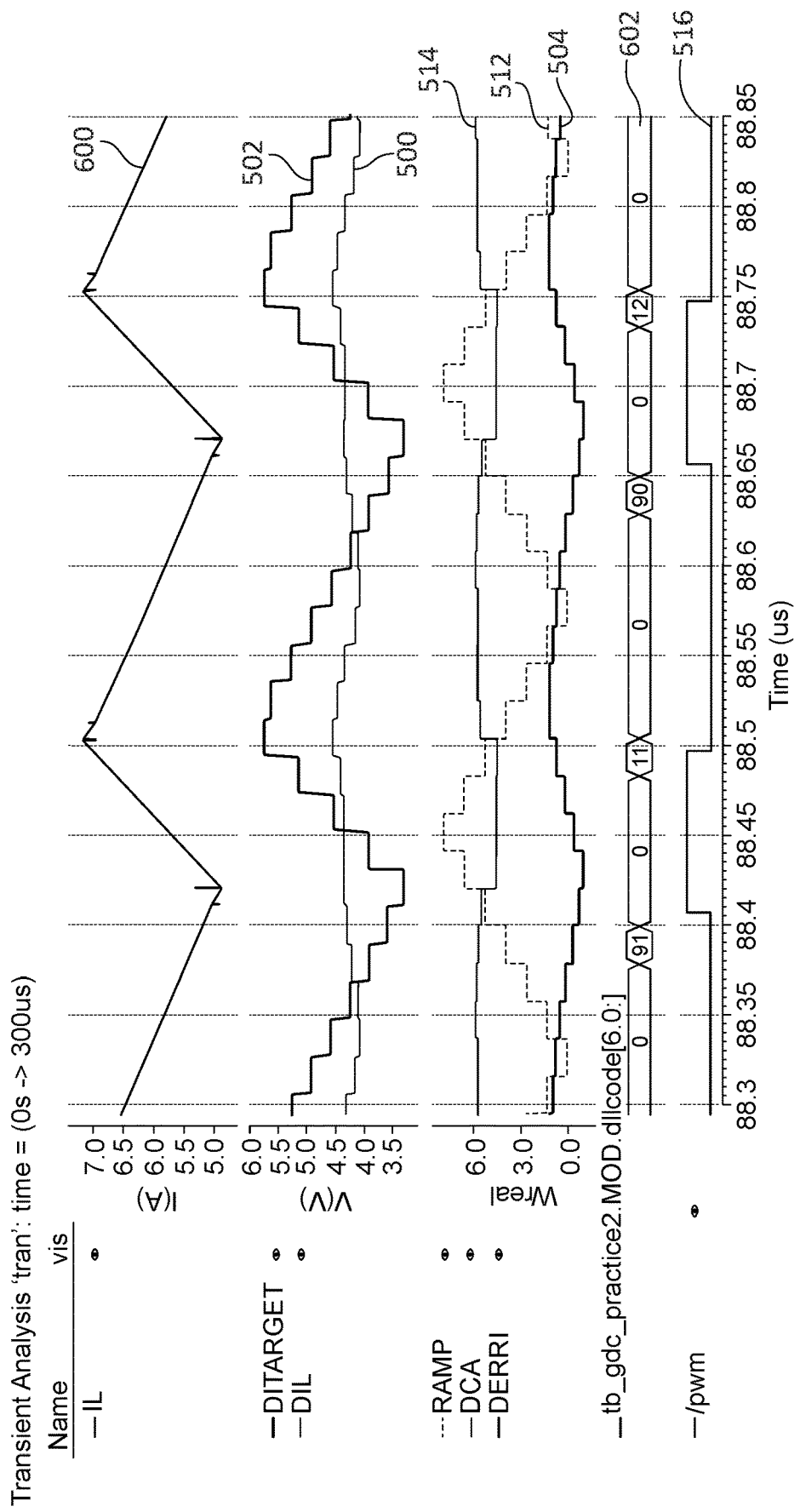
FIG. 6 is a graph showing simulation results for a practical implementation of the system of FIG. 4.

FIG. 6 is a graph showing simulation results for a practical implementation of the system of FIG. 4. The labelling of the traces is consistent with the labelling as applied previously. There is shown a trace 600 of the inductor current IL.

The digital target current DITARGET and the digitized inductor current DIL are differentiated, and the ripple has been cancelled. Then a fixed offset PDSS was added to give DCA.

Every time DCA is about to cross RAMP in the interval from TS/2 to 3TS/2 after evaluation, we see the DLL code is adjusted (labelled using numeral 602). It is sent to the DLL, and the signal PWM edges are triggered according to the DLL code. It can be observed that they are not aligned with rising/falling edges, but are at an intermediate point, thanks to the fine tuning.

Use of simultaneous leading/trailing edge modulation and management of the discrete-time quantization using local DLLs, as present in embodiments of the disclosure, may be used to further the performances and adapt to the needs of mobile communications.

Figure 7B:
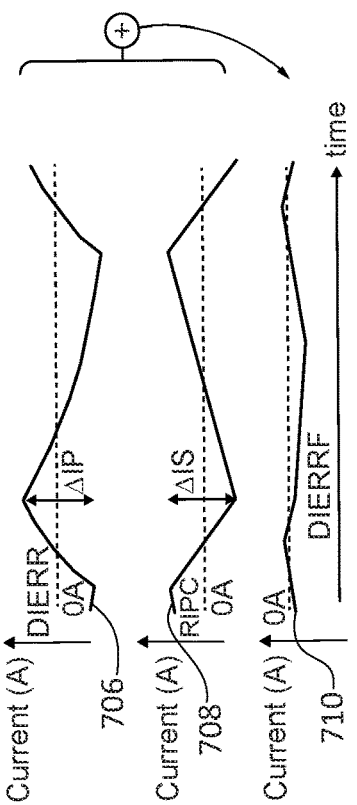
FIG. 7(b) is a graph showing the unfiltered digital current error, the ripple cancellation signal and the filtered digital current error.
Figure 7A:
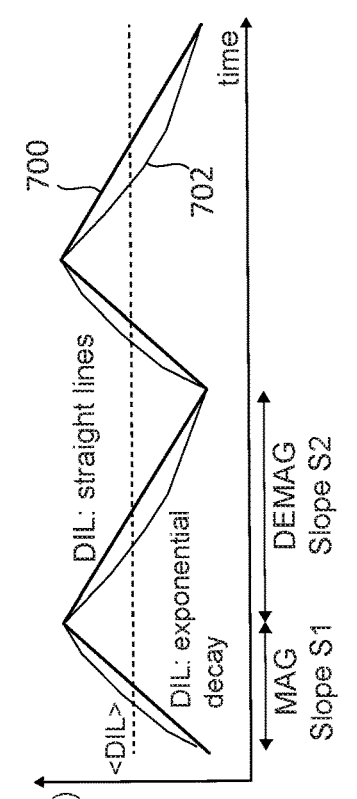
FIG. 7(a) is a graph showing the digitized inductor current varying with time.

FIG. 7(a) is a graph showing a trace 700 of the digitized inductor current DIL varying with time, where the slopes are formed by straight lines; and a trace 702 of the digitized inductor current DIL varying with time, where the slopes are non-linear.

The trace 700 shows an idealised shape of the digitized inductor current DIL, as is used in U.S. Pat. No. 9,419,627B2 and U.S. Pat. No. 9,667,260B2. However, in reality, the digitized inductor current DIL will not exhibit the idealised shape, and will instead have rising and falling slopes, for each period, with a non-linear profile. Specifically, the falling slope will exhibit an exponential decay and the rising slope will exhibit an inverse exponential growth. Note that the timing diagrams show continuous time and continuous data to aid in the clarity of the explanation.

The curvature of the slopes arises from the resistance contributions of the switching converter 202. For example, and with reference to the buck converter example as shown in FIG. 4, the resistance of the inductor 400, and the on resistances of the switches 402, 404 contribute to the non-linear profiles.

It will be appreciated that other switching converters, may also exhibit non-linear slope profiles of digital inductor current DIL (or digital current DI, when a different energy storage element is used).

In the discrete time domain (so clocked at TS, which is the processing period of the controller 200), the digitized inductor current DIL during the magnetisation phase, when the inductor is coupled to the input voltage Vin via the switch 402, may be represented as follows:

$$isynth[n] = isynth[n-1] - A(RHS) \cdot isynth[n-1] + B \cdot (Vin - Vout)/L \quad (8)$$

The digital inductor current DIL during the demagnetisation phase, when the inductor is coupled to ground PGND via the switch 404, may be represented as follows:

$$isynth[n] = isynth[n-1] - A(RLS) \cdot isynth[n-1] - B \cdot (VOUT)/L \quad (9)$$

The variable A-term is thus the non-linear correction to ideal slopes, contributed by the B-term.

$$A = TS \times \frac{R}{L} \quad (10)$$

where R is the sum of the direct current resistance (DCR) of the inductor 400 and RHS (when in magnetize); and R is the sum of the DCR and RLS (when in demagnetise); and is for the case of a buck converter. RHS is the on resistance of the switch 402, and RHL is the on resistance of the switch 404. B=TS, where TS is the processing period of the controller 200.

It is preferable to generate the ripple cancellation signal RIPC such that a filtered digital current error DIERRF may be generated without ripple. Note that index (t), such as for RIPC(t) may be used to denote continuous time, while indices [n] are for discrete time.

FIG. 7(b) is a graph showing a trace 706 of the unfiltered digital current error DIERR; a trace 708 of the ripple cancellation signal RIPC; and a trace 710 of the filtered digital current error DIERRF as may be acquired through application of equation (4). In the present example, the ripple cancellation signal RIPC uses straight line slopes.

As shown by equation (3), the digital current error signal DIERR is equal to the digital current signal DI minus the digital current target DITARGET, such that DIERR=DIL-DITARGET when the energy storage element 206 is the inductor.

As can be observed by the trace 706, DIERR inherits the non-linear ripple from DIL. The straight-line cancellation scheme using the ripple cancellation signal RIPC allows the filtered digital current error DIERRF to centre on 0 A. Therefore, the ripple cancellation signal RIPC having a straight line profile may be used with embodiments of the present disclosure to provide an improvement over known systems, for example, such as the system presented in FIG. 1(b).

However, the difficulty to match ΔIS and ΔIP (as labelled in FIG. 7(b), and unequal) and the residual DIERRF ripple, as shown in the trace 710, can create slow subharmonic oscillations that have been observed in simulations.

Figure 7C:
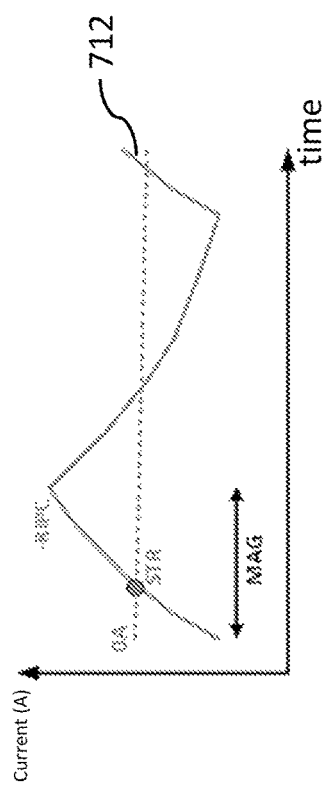
FIG. 7(c) is a graph of a negative idealised ripple cancellation signal which uses non-linear slopes.

Therefore, further improvements may be achieved through using a different ripple cancellation signal RIPC. FIG. 7(c) is a graph of a negative idealised ripple cancellation signal RIPC(t) which uses non-linear slopes. RIPC(t) is the inverse of the ripple on the inductor current IL, and its negative, −RIPC, is represented by a trace 712 as shown on FIG. 7(c).

The preferred characteristics of RIPC(t) are:
It is centered on 0 A. This is beneficial because it is desirable to cancel the ripple content whilst leaving the average of the digital inductor current DIL as being unaltered.
It cancels a recursive equation DIERR (t).

It will be appreciated that FIG. 7(c) shows an idealised representation, and an improvement in a practical system may be attainted over a ripple cancelation signal RIPC having straight line slopes without exactly matching the trace 712, or the preferred characteristics.

Figure 8B:
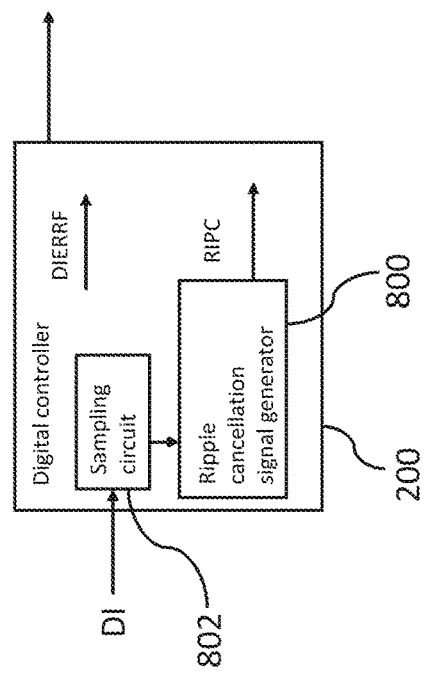
FIG. 8(b) is a schematic of a specific embodiment of the digital controller in accordance with a sixth embodiment of the present disclosure.
Figure 8A:
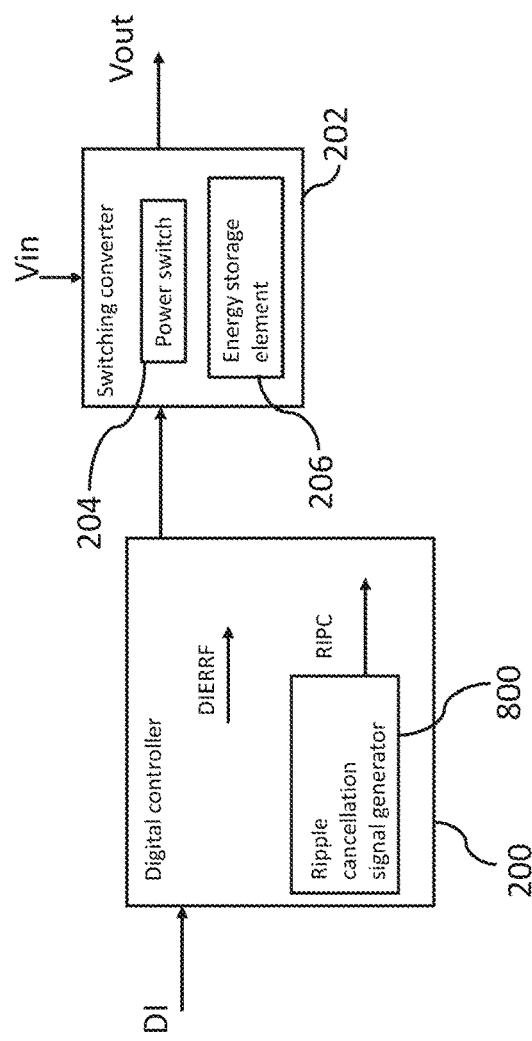
FIG. 8(a) is a schematic of a specific embodiment of the digital controller in accordance with a fifth embodiment of the present disclosure.

FIG. 8(a) is a schematic of a specific embodiment of the digital controller 200 comprising a ripple cancellation signal generator 800, and in accordance with a fifth embodiment of the present disclosure. It will be appreciated that the ripple cancellation signal generator 800 of the present embodiment may be used to generate the ripple cancellation signal RIPC of any of the embodiments described herein, and in accordance with the understanding of the skilled person.

The ripple cancellation signal RIPC comprises, within each signal period, a rising slope comprising a first non-linear portion and a falling slope comprising a second non-linear portion.

For example, in a specific embodiment, the ripple cancellation signal RIPC may have the profile as shown by the trace 712 in FIG. 7c).

In a specific embodiment, and with respect to cancelling the recursive equation DIERR (t), we may undertake a computation "back in time" to calculate the digitized inductor current DIL at a preceding time step and from the starting iteration as denoted by equation:

$$I(STR) = isynth[n-1] - A(RHS) \cdot isynth[n-1] + B \cdot (Vin - Vout)/L \quad (11)$$

This may then be used to generate the ripple cancellation signal RIPC.

However, it may be difficult to generate the RIPC(t) curve before STR, because the start point of the magnetization of the inductor 400 may be difficult to detect due to the computation requiring assessing the digital inductor current DIL at a previous time step.

Feasibility studies show that it is fundamentally possible to generate the ripple cancellation signal RIPC in this way, but it would require a computation clock beyond 5 GHz, which would lead to consume >100 mA and degrade the efficiency by 30%.

FIG. 8(b) is a schematic of a specific embodiment of the digital controller 200 of FIG. 8(a), in accordance with a sixth embodiment of the present disclosure. In the present disclosure, the digital controller further comprises sampling circuitry 802 configured to sample the digital current signal DI. The ripple cancellation signal generator 800 is configured to generate the ripple cancellation signal RIPC using the sampled digital current signal DI. It will be noted that the following description relates to the energy storage element 206 being the inductor 400, such that the digital current signal DI is the digitized inductor current DIL. It will be appreciated that the ripple cancellation signal generator 800 of the present embodiment may be used to generate the ripple cancellation signal RIPC of any of the embodiments described herein, and in accordance with the understanding of the skilled person.

Figure 9B:
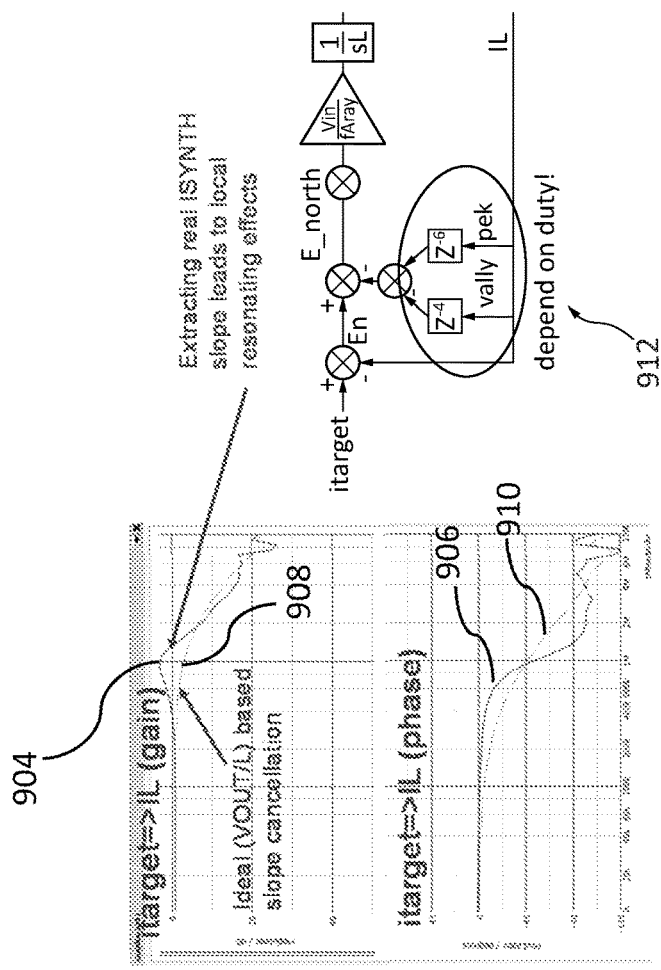
FIG. 9(b) is a graph of the gain and phase relationships using the sampling method compared with an idealised ripple cancellation signal and a schematic of a simulated circuit.
Figure 9A:
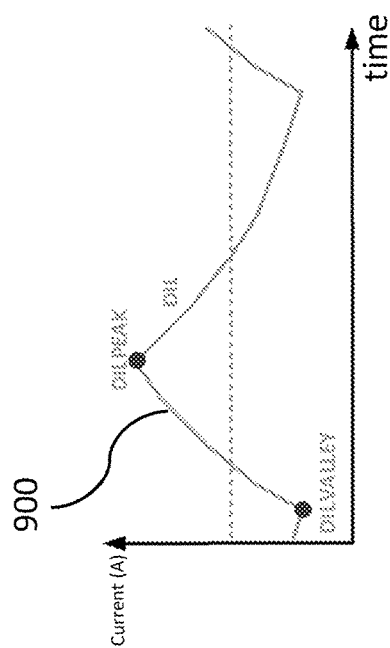
FIG. 9(a) is a graph showing the digitized inductor current for sampling.

FIG. 9(a) is a graph showing a trace 900 of the digitized inductor current DIL for sampling using the sampling circuitry 802. To generate the ripple cancellation signal RIPC (t), on each cycle of switching of the switching converter DILPEAK and DILVALLEY (as labelled on FIG. 9(a)) may be extracted, and the ripple cancellation signal RIPC may be generated using the following equation:

$$RIPC(t) = (DILPEAK + DILVALLEY)/2 - DIL(t) \quad (12)$$

FIG. 9(b) is a graph 902 of the gain and phase relationships using the sampling method of the present embodiment (traces 904, 906) compared with an idealised ripple cancellation signal RIPC(traces 908, 910), and a schematic 912 of the simulated circuit of the present embodiment, relating to a practical implementation of the system.

The sampling technique means there are local loops (for sample/extract) that create resonating effects and lead to subharmonic oscillations. Simplis POP simulations showed these resonances as depicted in FIG. 9(b).

Figure 10:
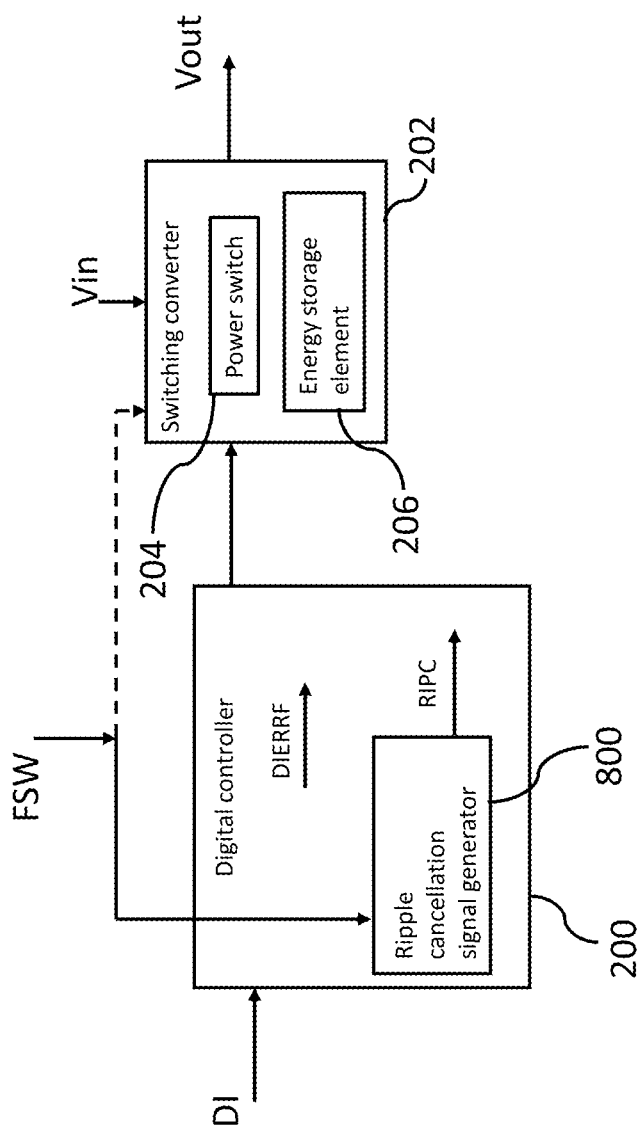
FIG. 10 is a schematic of a specific embodiment of the digital controller, in accordance with a seventh embodiment of the present disclosure.

FIG. 10 is a schematic of a specific embodiment of the digital controller 200, in accordance with a seventh embodiment of the present disclosure. It will be appreciated that the ripple cancellation signal generator 800 of the present embodiment may be used to generate the ripple cancellation signal RIPC of any of the embodiments described herein, and in accordance with the understanding of the skilled person.

The ripple cancellation signal generator 800 is configured to receive a clock signal. The clock signal FSW is a periodic digital signal with a switching frequency that is equal to the switching frequency FSW of the switching converter 202. The clock signal is denoted using "FSW" in FIG. 10.

The ripple cancellation signal generator 800 operates to generate the ripple cancellation signal RIPC using the clock signal FSW. The ripple cancellation signal generator 800 may operate to generate the ripple cancellation signal RIPC using the clock signal FSW and the PWM signal. The signal period of the ripple cancellation signal RIPC is equal to the period of the clock signal FSW.

The switching frequency of the switching converter 202 may also be controlled by the clock signal FSW. The clock signal FSW may be provided by a clock circuit (not shown).

Figure 11:
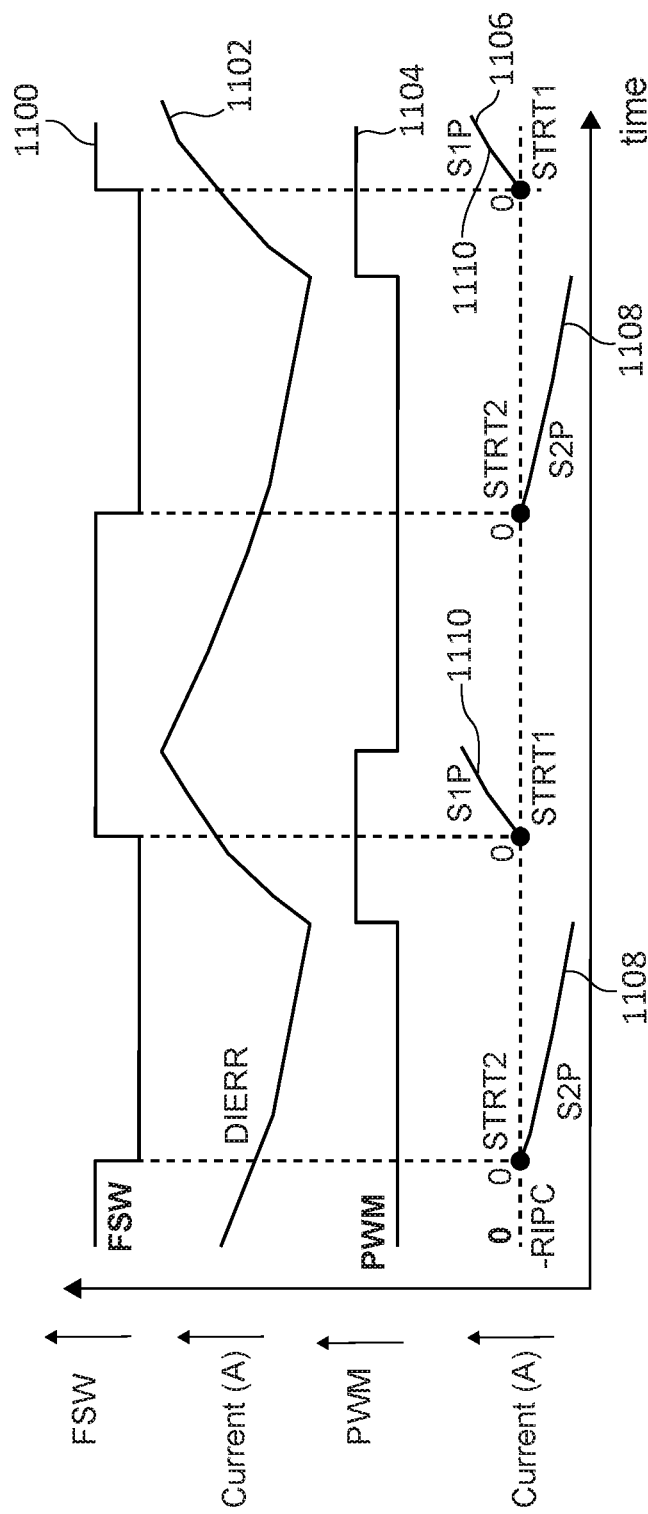
FIG. 11 is a graph showing waveforms relating to the operation of the system of FIG. 10.

FIG. 11 is a graph showing waveforms relating to the operation of the system of FIG. 10. There is shown a trace 1100 of the clock signal FSW; a trace 1102 of the digitized current error signal DIERR; a trace 1104 of the PWM signal; and a trace 1106 of a negative of the ripple correction signal RIPC.

In the present graph, the trace 1106 is discontinuous and shows a portion of the overall ripple cancellation signal RIPC. The trace 1106 includes non-linear portions 1108 (also labelled S2P) of the rising slope and non-linear portions 1110 (also labelled S1P) of the falling slope of the ripple cancellation signal RIPC. It should be noted that in the graph the falling slope is rising and the rising slope is falling due to −RIPC being shown.

The ripple cancellation signal generator 800 may be configured to generate the ripple cancellation signal RIPC by setting the ripple cancellation signal RIPC to zero at each transition of the clock signal FSW, as shown in FIG. 11.

As discussed previously, the sampling technique enabled by the controller 200 of FIG. 8(b) results in resonating local loops. The resonating local loops can be removed by avoiding the sampling effects. This is achieved by setting the ripple cancellation signal RIPC at each transition of the clock signal FSW at values of 0, that do not depend on the unfiltered digital current error DIERR.

The clock signal FSW clock edges are used to start the non-linear slopes S1P and S2P at values of 0. S1P and S2P can be recalculated in the same way as the recursive equation DIL (that gave DIERR). So, subtracting S1P and S2P from DIERR in the shown segments leads to mathematical cancellation of the ripple on the result DIERRF. The start/stop of these segments is chosen because this is where the decision to start/stop the signal PWM is done.

In a specific embodiment and within each signal period, the rising slope of the ripple cancellation signal RIPC may comprise a first linear portion and the falling slope of the ripple cancellation signal RIPC may comprise a second linear portion.

In a specific embodiment, the rising slope comprises the first linear portion rising linearly to zero, and the first non-linear portion rising non-linearly from zero. Additionally, the falling slope comprises the second linear portion falling linearly to zero, and the second non-linear portion falling non-linearly from zero.

Figure 12:
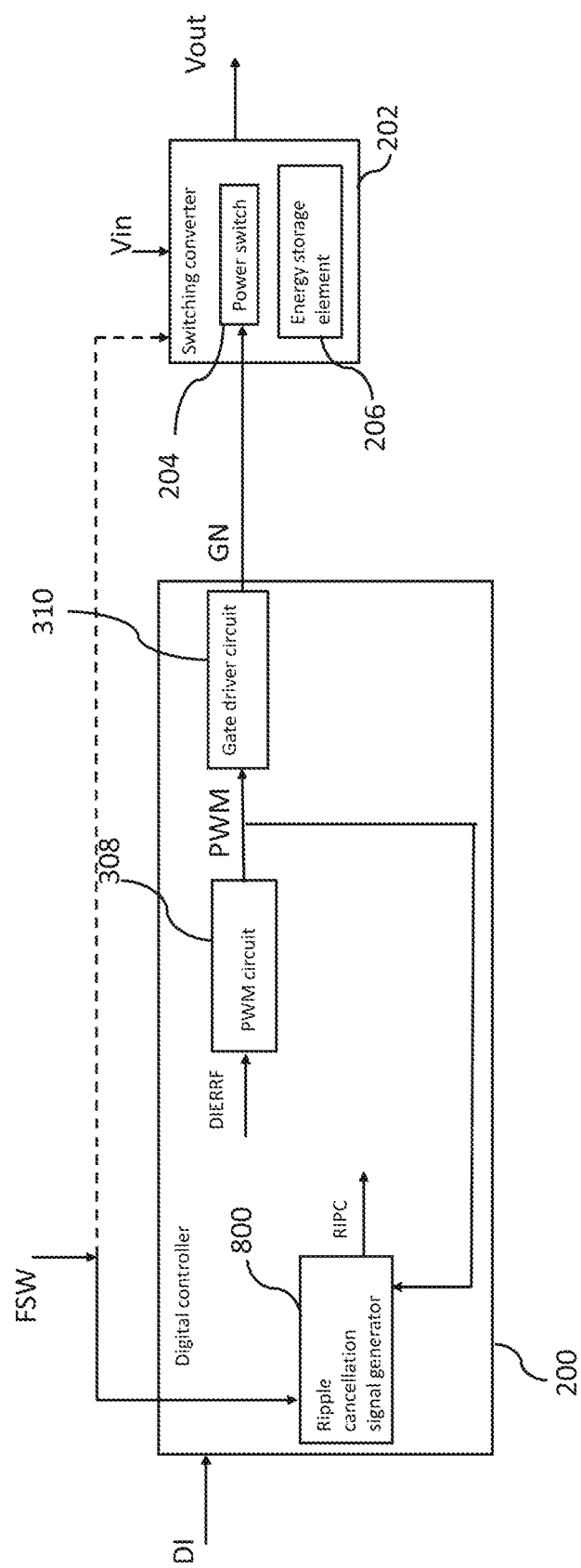
FIG. 12 is a schematic of a specific embodiment of the digital controller, in accordance with an eighth embodiment of the present disclosure.

FIG. 12 is a schematic of a specific embodiment of the digital controller 200, in accordance with an eighth embodiment of the present disclosure. It will be appreciated that the ripple cancellation signal generator 800 of the present embodiment may be used to generate the ripple cancellation signal RIPC of any of the embodiments described herein, and in accordance with the understanding of the skilled person.

Compared to the digital controller 200 of FIG. 10, the digital controller 200 of the present embodiment further comprises the PWM circuit 308 and the gate driver circuit 310, which function as described previously. In the present embodiment, the ripple cancellation signal generator is configured to generate the ripple cancellation signal RIPC using the PWM signal.

Figure 13:
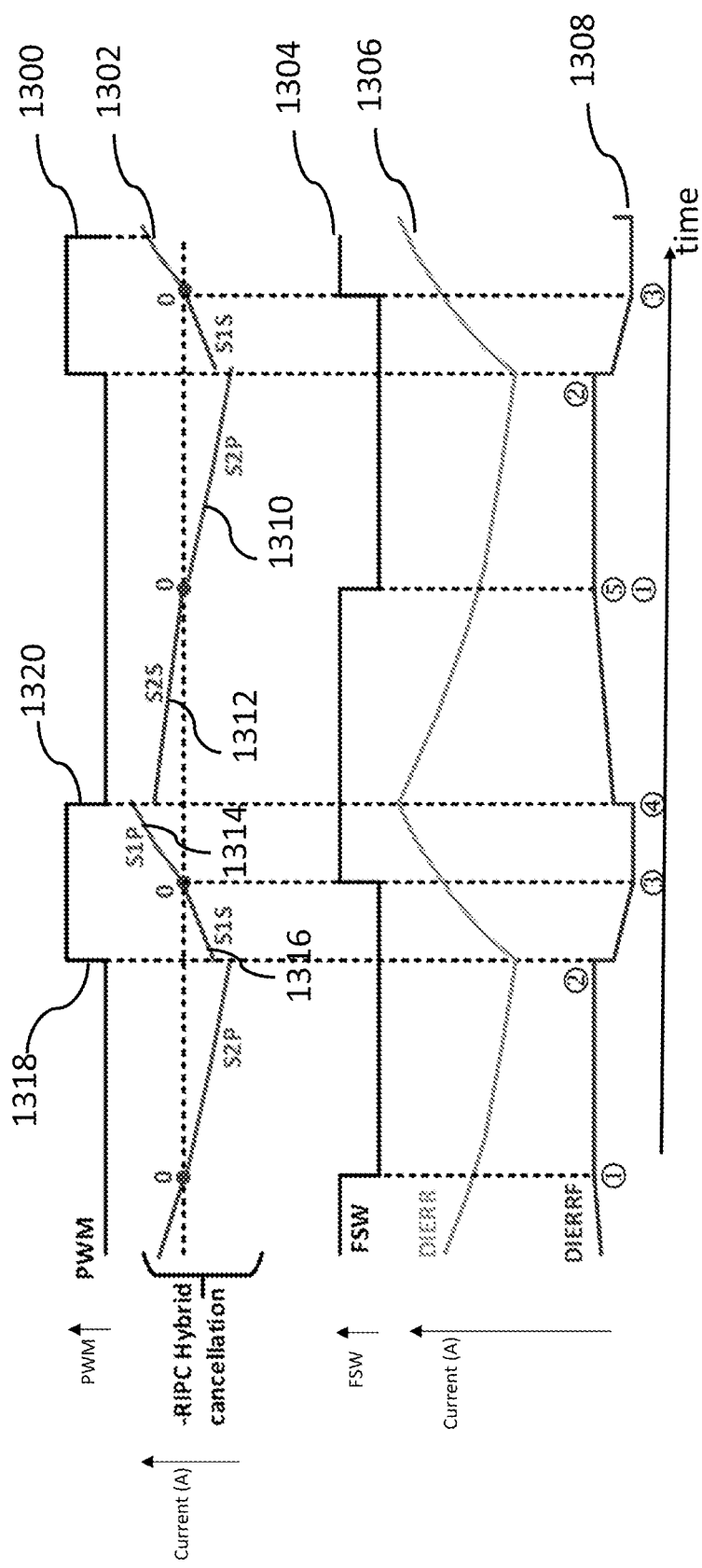
FIG. 13 is a graph showing waveforms relating to the operation of the system of FIG. 12.

FIG. 13 is a graph showing waveforms relating to the operation of the system of FIG. 12. There is shown a trace 1300 of the PWM signal; a trace 1302 of the negative of the ripple cancellation signal RIPC; a trace 1304 of the clock signal FSW; a trace 1306 of the unfiltered digital current error DIERR; and a trace 1308 of the filtered digital current error DIERRF.

The rising slope of the ripple cancellation signal RIPC comprises a non-linear portion 1310 (also labelled S2P) and a linear portion 1312 (also labelled S2S) within each period. The falling slope of the ripple cancellation signal RIPC comprises a non-linear portion 1314 (also labelled S1P) and a linear portion 1316 (also labelled S1S) within each period.

The non-linear portion S1P has an exponential decay profile and the non-linear portion S2P has an inverse exponential growth profile in the present embodiment. It will be appreciated that these profiles are inverted in FIG. 13 as –RIPC is shown, whereas a graph of RIPC would show the profiles as described.

In a specific embodiment, the ripple cancellation signal generator 800 may be configured to generate the ripple cancellation signal RIPC using the PWM signal by transitioning alternately between the rising slope and the falling slope of the ripple cancellation signal RIPC at each transition of the PWM signal. This is shown at the occurrences of PWM signal edges in FIG. 13, as labelled by numerals 1318 and 1320.

The PWM signal comprises a magnetize state and a demagnetize state. The ripple cancellation signal generator 800 may be configured to generate the ripple cancelation signal RIPC by generating the falling slope when the PWM signal is in the magnetise state and generating the rising slope when the PWM signal is in the demagnetize state.

For an embodiment where the energy storage element 206 is the inductor 400 the first linear portion of the rising slope S2S is equal to the output voltage Vout divided by the inductance L and the second linear portion S1S of the falling slope is equal to the output voltage Vout minus the input voltage Vin, divided by the inductance L.

It can be observed with reference to FIG. 13, that the embodiment presented in FIG. 12 generated the ripple cancellation signal RIPC by combining both linear and non-linear slopes, which offers the following advantages:

True mathematical ripple cancellation is preferred when the resultant filtered digital current error DIERRF will cross the ramp signal RAMP. In this case it is preferable to use S1P/S2P that exactly track digital inductor current DIL slopes.

Once crossing is of DIERRF and RAMP is completed, indicated by the PWM signal, it is preferable to avoid large discontinuity in DIERRF (and DCA) characteristics: therefore S1S/S2S are used as they guarantee 0 for the next swap to S1P/S2P without large computation requirements.

The selection of S1P, S2P, S1S, S2S is shown in the FIG. 13, as well as the filtered digital current error DIERRF, as provided by equation (4).

Note that advantages are provided by the use of a leading/trailing modulation scheme. Specifically, discounting the delays of power stage, the clock signal FSW DCDC-clock rising/falling edges are at mid-point of Magnetize/Demagnetize, thereby allowing the swap between the slope to occur at a moment when no decision is being made.

FIG. 13 may be further summarised using the depicted time marks over a complete TSW period:
1. On FSW clock falling edge, RIPC uses S2P to compensate for the ripple on DIERR. As DIERR itself has the same slope S2P, we have thus a mathematical cancellation: DIERRF is flat.
2. Crossing was detected and PWM is now "1". We no longer need perfect cancellation, but we preferably suppress any sampling effects and any dependency on DIERR itself. So, we use the straight slope S1S. It introduces a moderate jump and residual curvature.
3. On FSW clock rising edge, properties of leading/trailing edge are such that crossing DCA (which is just a shifted version of DIERRF) with RAMP happens later after this mark. Also, S1S reached 0, so RIPC is swapped to S1P, and it starts from 0. From this point, mathematical cancellation is ensured.
4. Crossing DIERRF/DCA happens and PWM goes back down. Perfect cancellation is not needed anymore, so we use S2S, which will guarantee us 0 at next swap.
5. Leading/trailing edge modulator ensures crossing will occur after this mark. Swap to S2P, like mark 1.

Figure 14:
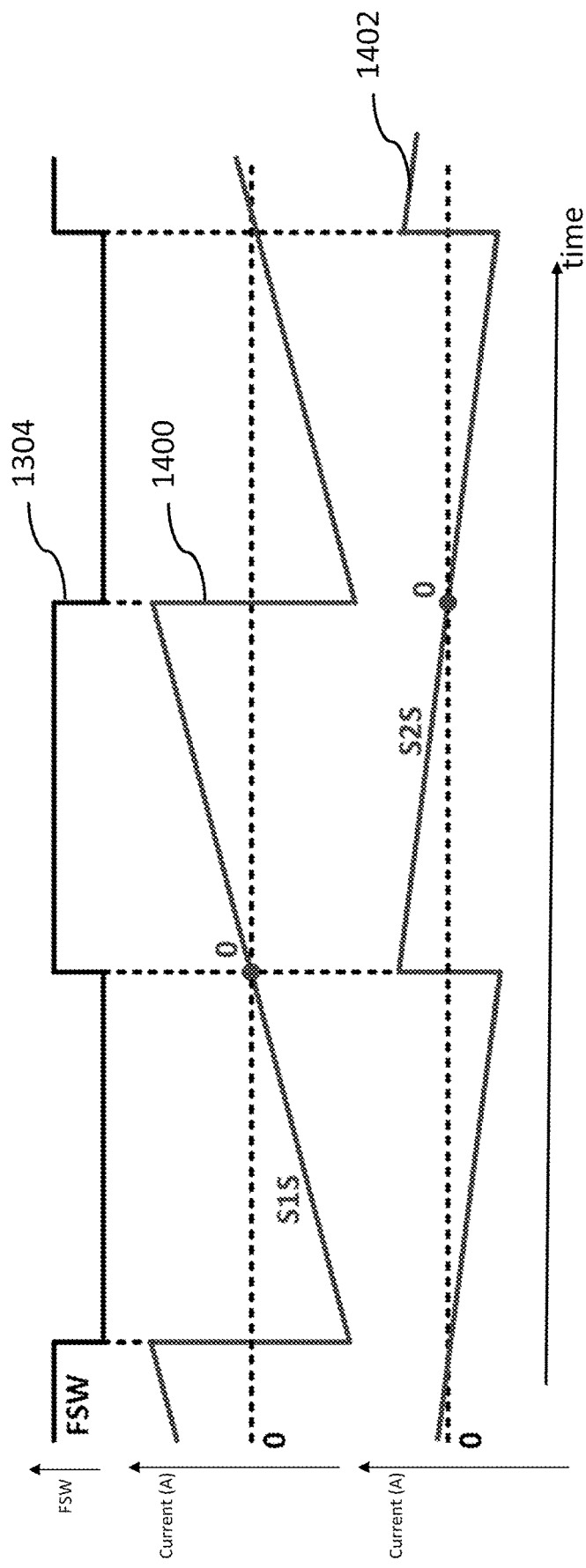
FIG. 14 is a graph showing the generation of the straight slopes, that may be used for the straight slope portions of the ripple cancellation signal.

FIG. 14 is a graph showing the generation of the straight slopes, that may be used for the straight slope portions of the ripple cancellation signal RIPC, for example, of the embodiment described in relation to FIGS. 12 and 13. There is shown a trace 1400 for the generation of a first straight slope; and a trace 1402 for the generation of a second straight slope.

The result DIERRF from the correction (DIERR (t)+RIPC (t)) preferably shows minimal discontinuities. This is the slope of the signal DIERRF that is used for generating PWM (for example, as described in relation to FIG. 5(*c*)). Sudden transitions of DIERRF can lead to erroneous slope calculations, with the use of straight slope portions of the ripple cancellation signal RIPC resolving this issue.

For the negative of the ripple cancellation signal RIPC, S1S straight slope during MAGNETIZE is equal to (Vin−Vout)/L; and S2S straight slope during DEMAGNETIZE is equal to −Vout/L.

It will be appreciated that the slopes for the ripple cancellation signal RIPC will be provided by the equations for the negative signal multiplied by minus 1.

These slopes are started and reset such that they cross 0 on the edges of the DCDC clock FSW. Thus, they are independent from DIERR. It is simple to calculate the starting point of these slopes at the moment they are reset (on one FSW edge) to guarantee the 0-crossing on the other FSW edge.

Figure 15:
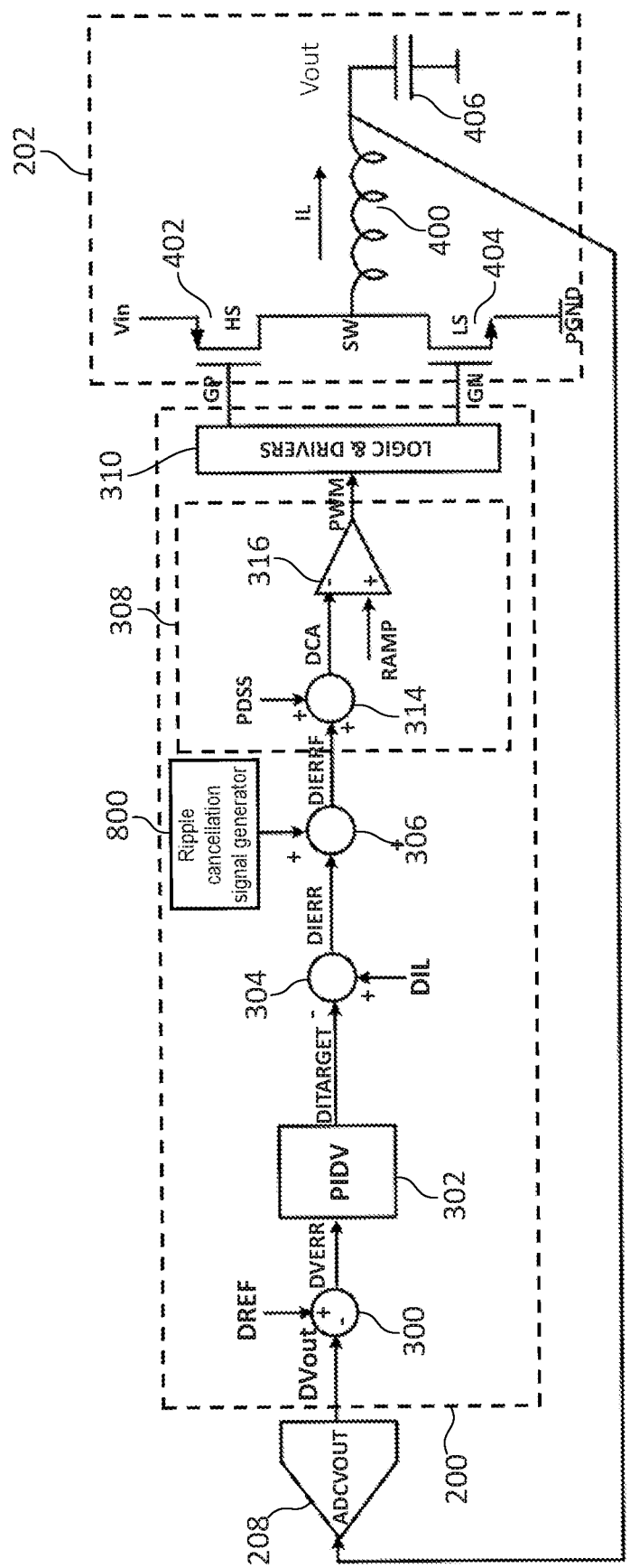
FIG. 15 is a schematic of a specific embodiment of the digital controller and buck converter, in accordance with a ninth embodiment of the present disclosure.

FIG. 15 is a schematic of a specific embodiment of the digital controller 200 and buck converter 202, where the digital controller 200 comprises the ripple cancellation signal generator 800, which may correspond to any of the embodiments as described herein, and in accordance with a ninth embodiment of the present disclosure. In this specific example, the ripple cancellation generator 800 functions as described for the embodiment presented in FIG. 12.

Figure 16:
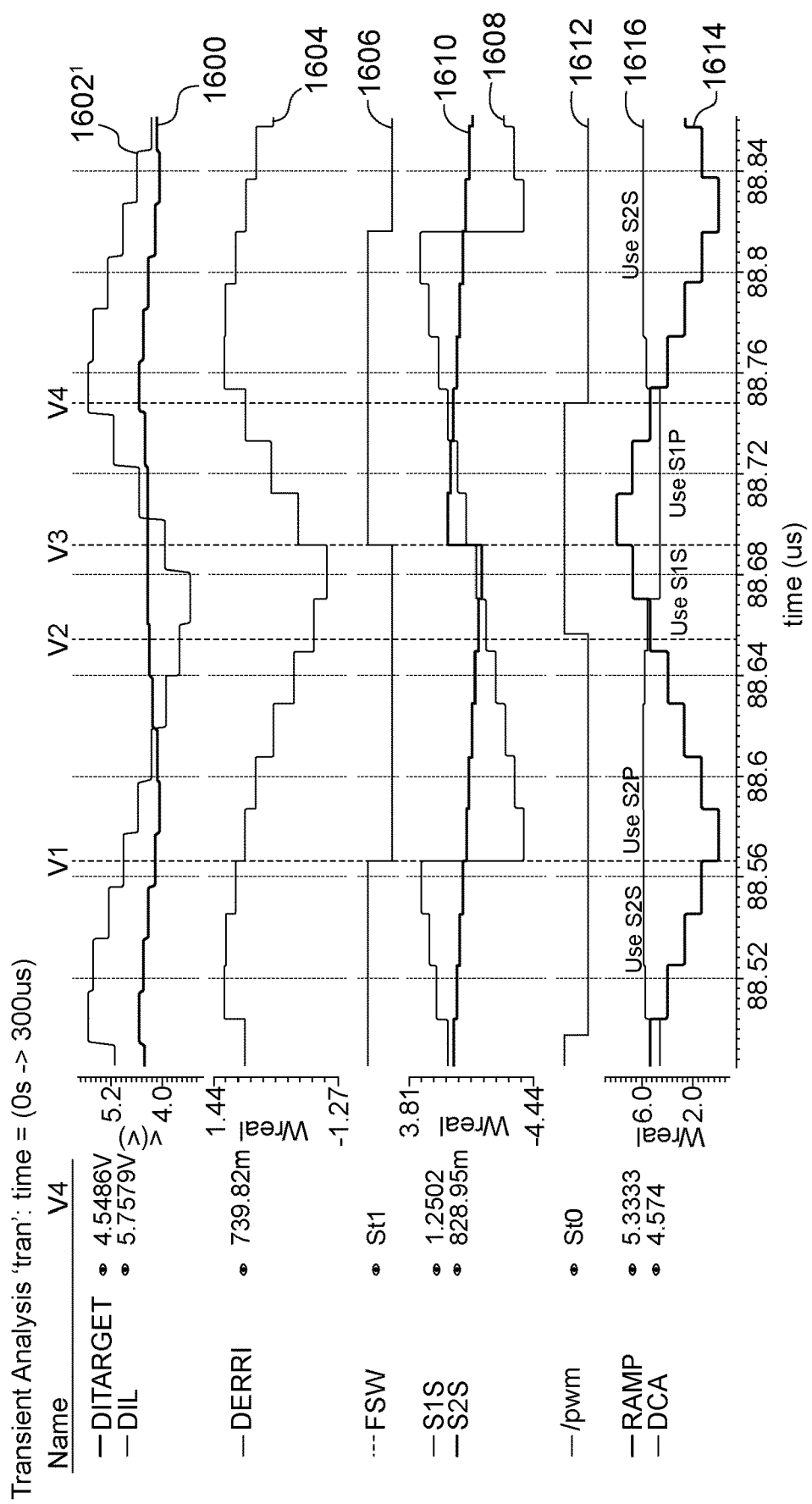
FIG. 16 is a graph showing simulations results for a practical implementation of the system presented in FIG. 15.

In summary, the controller 200 acts to cancel the non-linear ripple of the digital inductor current signal DIL by the use of a ripple cancellation signal RIPC having straight slopes, that enable the avoidance of any parasitic sampling effect, and of non-linear slopes, that allow mathematical cancellation at the critical decision times. FIG. 16 is a graph showing simulations results for a practical implementation of the system presented in FIG. 15. FIG. 16 is a discrete time simulation. It should be noted that DCA is the shifted version of DIERRF but has the same ripple.

There is shown a trace 1600 of the digital current target DITARGET; a trace 1602 of the digital inductor current DIL; a trace 1604 of the unfiltered digital current error DIERR; a trace 1606 of the clock signal FSW; a trace 1608 of the straight slope S1S; a trace 1610 of the straight slope S2S; a trace 1612 of the PWM signal; a trace 1614 of the ramp signal RAMP; and a trace 1616 of the digital signal DCA.

Figure 17B:
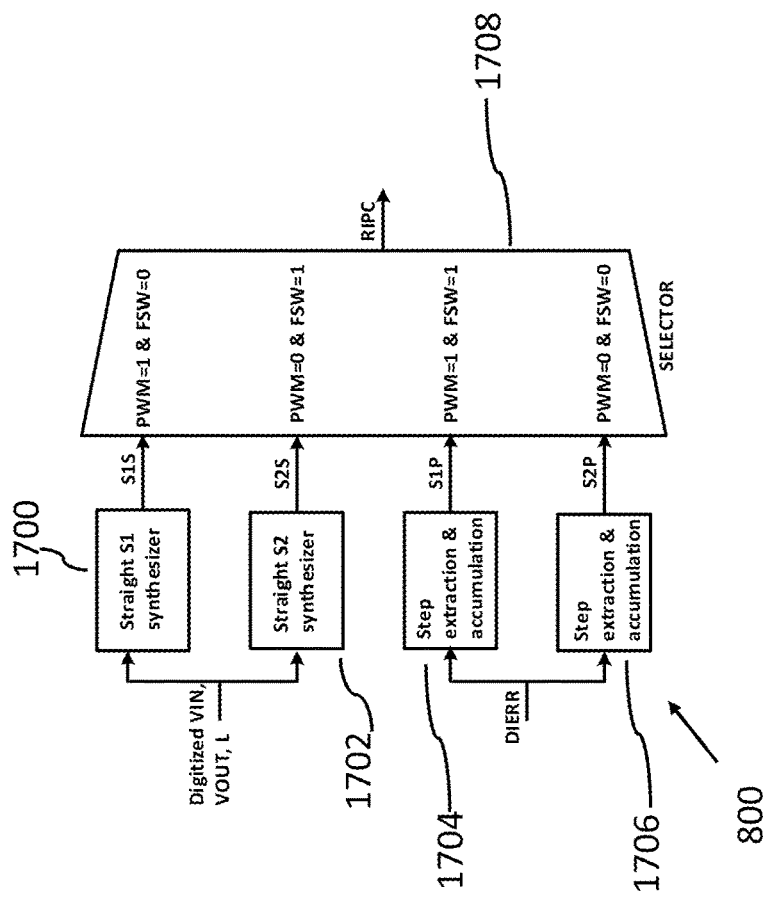
FIG. 17(b) is a schematic of a specific example of the ripple cancellation signal generator.
Figure 17A:
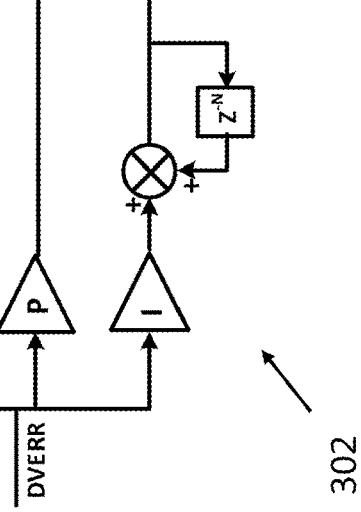
FIG. 17(a) is a schematic of a specific example of a digital loop control proportional-integral-derivative circuit.

FIG. 17(*a*) is a schematic of a specific example of PID 302, as may be used with any of the embodiments described herein, in accordance with the understanding of the skilled person. D, P, I are gains that are used for adjustment.

FIG. 17(*b*) is a schematic of a specific example of the ripple cancellation signal generator 800 as may be used with any of the embodiments described herein, in accordance with the understanding of the skilled person. The signal generator 800 in the present example comprises synthesizers 1700, 1702; step extraction and accumulation units 1704, 1706; and a selector circuit 1708.

S1S and S2S are straight slopes created following the FIG. 14 by synthesizers 802, 804, with the knowledge of the digitized VIN, VOUT, L, so that the slopes are S1S=(VIN−VOUT)/L and S2S=(−VOUT)/L in the digital domain.

S1P and S2P are cumulative slopes: they are reset to 0 until they are selected (as in FIG. 11). Then they are built by accumulating the steps coming from DIERR. For example, S1P is in the FIG. 13 from 0 until time 3, then it is built using the same digital steps as DIERR.

Various improvements and modifications may be made to the above without departing from the scope of disclosure.

The invention claimed is:

1. A digital controller for a switching converter configured to receive an input voltage and to generate an output voltage, the switching converter comprising one or more power switches and an energy storage element, the digital controller comprising a ripple cancellation signal generator configured to generate a ripple cancellation signal, the digital controller being configured to:
receive a digitized current signal, the digitized current signal being a digital representation of a current flow through the energy storage element;
generate a filtered digital current error signal using the digitized current signal and the ripple cancellation signal, the ripple cancellation signal being arranged to reduce ripple from the digitized current signal in the generation of the filtered digital current error signal; and
control the switching converter, the control of the switching converter being dependent on the filtered digital current error signal; wherein:
the ripple cancellation signal, within each signal period, comprises:
a rising slope comprising a first non-linear portion; and/or
a falling slope comprising a second non-linear portion.

2. The digital controller of claim 1 comprising sampling circuitry configured to sample the digital current signal, wherein the ripple cancellation signal generator is configured to generate the ripple cancellation signal using the sampled digital current signal.

3. The digital controller of claim 1, wherein the ripple cancellation signal generator is configured to:
receive a clock signal, the clock signal being a periodic digital signal having a switching frequency that is derived from the switching frequency of the switching converter; and
generate the ripple cancellation signal using the clock signal; wherein:
the signal period of the ripple cancellation signal is equal to the period of the clock signal.

4. The digital controller of claim 3, wherein the switching frequency of the switching converter is controlled by the clock signal.

5. The digital controller of claim 3, wherein the ripple cancellation signal generator is configured to generate the ripple cancellation signal by setting the ripple cancellation signal to zero at each transition of the clock signal.

6. The digital controller of claim 1, wherein the ripple cancellation signal, within each signal period, comprises:
the rising slope comprising a first linear portion; and/or
the falling slope comprising a second linear portion.

7. The digital controller of claim 6, wherein:
the rising slope comprises:
the first linear portion rising linearly to zero; and
the first non-linear portion rising non-linearly from zero; and
the falling slope comprises:
the second linear portion falling linearly to zero; and
the second non-linear portion falling non-linearly from zero.

8. The digital controller of claim 7 comprising:
a pulse width modulation circuit configured to generate a PWM signal using the filtered digital current error signal; and
a logic and gate driver circuit configured to receive the PWM signal and to generate a gate driving signal for each of the one or more power switches using the PWM signal; wherein:
the ripple cancellation signal generator is configured to generate the ripple cancellation signal using the PWM signal.

9. The digital controller of claim 8, wherein the ripple cancellation signal generator configured to generate the ripple cancellation signal using the PWM signal by transition alternately between the rising slope and the falling slope at each transition of the PWM signal.

10. The digital controller of claim 9, wherein:
the PWM signal comprises a magnetize state and a demagnetize state; and
the ripple cancellation signal generator is configured to generate the ripple cancelation signal by generating the falling slope when the PWM signal is in the magnetise state and generating the rising slope when the PWM signal is in the demagnetize state.

11. The digital controller of claim 6, wherein the energy storage element is an inductor having an inductance.

12. The digital controller of claim 11, wherein the first linear portion of the rising slope is equal to the output voltage divided by the inductance and the second linear portion of the falling slope is equal to the output voltage minus the input voltage, divided by the inductance.

13. The digital controller of claim 1, wherein the first non-linear portion has an inverse exponential growth profile and the second non-linear portion has an exponential decay profile.

14. The digital controller of claim 7, wherein the ripple cancellation signal generator is configured to generate the ripple cancellation signal based on an operational state of the switching converter.

15. The digital controller of claim 14, wherein the operational state of the switching converter is derived from the driving state of the switching converter and/or the actual state of the switching converter.

16. The digital controller of claim 15, wherein the driving state is dependent on one or more PWM signals and/or the actual state is dependent on the switching state of the one or more power switches.

17. The digital controller of claim 16, wherein the switching converter is a buck-boost converter and the driving state is dependent on two PWM signals.

18. The digital controller of claim 16 comprising:
a pulse width modulation circuit configured to generate the one or more PWM signals using the filtered digital current error signal; and
a logic and gate driver circuit configured to receive the one or more PWM signals and to generate a gate driving signal for each of the one or more power switches using the one or more PWM signals; wherein:
the ripple cancellation signal generator is configured to generate the ripple cancellation signal using the one or more PWM signals.

19. The digital controller of claim 18, wherein the ripple cancellation signal generator configured to generate the ripple cancellation signal using the one or more PWM signals by transition alternately between the rising slope and the falling slope at each transition of at least one of the one or more PWM signals.

20. The digital controller of claim 19, wherein:
each of the one or more PWM signals comprises a magnetize state and a demagnetize state; and
the ripple cancellation signal generator is configured to generate the ripple cancelation signal by generating the falling slope when at least one of the one or more PWM signals is in the magnetise state and generating the rising slope when at least one of the one more PWM signals is in the demagnetize state.

21. A method of controlling, using a digital controller, a switching converter configured to receive an input voltage and to generate an output voltage, the switching converter comprising one or more power switches and an energy storage element, the digital controller comprising a ripple cancellation signal generator configured to generate a ripple cancellation signal, the method comprising:
receiving a digitized current signal, the digitized current signal being a digital representation of a current flow through the energy storage element;
generating a filtered digital current error signal using the digitized current signal and the ripple cancellation signal, the ripple cancellation signal being arranged to reduce ripple from the digitized current signal in the generation of the filtered digital current error signal; and
controlling the switching converter, the control of the switching converter being dependent on the filtered digital current error signal; wherein:
the ripple cancellation signal, within each signal period, comprises:
a rising slope comprising a first non-linear portion; and/or
a falling slope comprising a second non-linear portion.

* * * * *